United States Patent
Li et al.

(10) Patent No.: US 11,025,627 B2
(45) Date of Patent: Jun. 1, 2021

(54) SCALABLE AND SECURE RESOURCE ISOLATION AND SHARING FOR IOT NETWORKS

(71) Applicant: Intel Corporation, Santa Clara, CA (US)

(72) Inventors: Weigang Li, Shanghai (CN); Ned M. Smith, Beaverton, OR (US); Changzheng Wei, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 15/865,984

(22) Filed: Jan. 9, 2018

(65) Prior Publication Data
US 2019/0014117 A1      Jan. 10, 2019

Related U.S. Application Data

(60) Provisional application No. 62/530,662, filed on Jul. 10, 2017.

(51) Int. Cl.
*H04L 29/06* (2006.01)
*H04L 29/08* (2006.01)
(Continued)

(52) U.S. Cl.
CPC ............ *H04L 63/10* (2013.01); *H04L 9/3213* (2013.01); *H04L 63/0464* (2013.01);
(Continued)

(58) Field of Classification Search
CPC ..... H04L 63/10; H04L 9/3213; H04L 63/061; H04L 63/0807; H04L 65/1073; H04L 67/10; H04L 67/16
(Continued)

(56) References Cited

U.S. PATENT DOCUMENTS

| | | | |
|---|---|---|---|
| 8,438,658 B2 * | 5/2013 | Hofstee | G06F 21/57 705/50 |
| 8,533,713 B2 * | 9/2013 | Dong | G06F 9/4856 718/1 |

(Continued)

FOREIGN PATENT DOCUMENTS

WO    WO-2017053048 A1 *   3/2017   ............. H04L 67/12

OTHER PUBLICATIONS

"OCF CORE Specfication V1.0.0 Part 1", Open Connectivity Foundation (OCF), (Mar. 22, 2017), 175 pgs.

(Continued)

*Primary Examiner* — Shahriar Zarrineh
(74) *Attorney, Agent, or Firm* — Schwegman Lundberg & Woessner, P.A.

(57) ABSTRACT

Various systems and methods of scalable and secure resource isolation and sharing for Internet of Things (IoT) networks, are described. Techniques for requesting inter-domain resource access and enabling resource sharing with use of an inter domain token are also described. In an example, communications in an IoT network to establish connectivity between a first device in a first domain and a second device in a second domain may include: receiving, from the first device at a collaboration cloud service, a request to access a resource of the second device; requesting and receiving, from an authorization provider, an inter-domain authorization token; and requesting, from the second device, access to the resource using the inter-domain authorization token; communications from the first device to access the second device are then performed between the first device and the second device based on a session key obtained with the inter-domain authorization token.

25 Claims, 13 Drawing Sheets

(51) Int. Cl.
*H04L 9/32* (2006.01)
*H04W 12/06* (2021.01)
*H04W 12/08* (2021.01)
*H04W 12/00* (2021.01)

(52) U.S. Cl.
CPC .......... *H04L 63/061* (2013.01); *H04L 63/062* (2013.01); *H04L 63/0807* (2013.01); *H04L 65/1073* (2013.01); *H04L 67/10* (2013.01); *H04L 67/12* (2013.01); *H04L 67/14* (2013.01); *H04L 67/145* (2013.01); *H04L 67/16* (2013.01); *H04L 67/20* (2013.01); *H04L 67/2833* (2013.01); *H04L 67/42* (2013.01); *H04W 12/06* (2013.01); *H04W 12/08* (2013.01); *H04L 2209/805* (2013.01); *H04W 12/009* (2019.01)

(58) Field of Classification Search
USPC .......................................................... 726/4
See application file for complete search history.

(56) References Cited

U.S. PATENT DOCUMENTS

| | | | | |
|---|---|---|---|---|
| 8,625,788 B2* | 1/2014 | Pendakur | ............... | G06F 21/123 380/200 |
| 8,694,795 B1* | 4/2014 | Aissi | ............... | G06F 21/30 713/187 |
| 8,832,813 B1* | 9/2014 | Cai | ............... | G06F 21/32 726/7 |
| 9,223,982 B2* | 12/2015 | Adams | ............... | G06F 21/57 |
| 9,286,457 B2* | 3/2016 | Beatson | ............... | G06F 21/32 |
| 9,672,342 B2* | 6/2017 | Walsh | ............... | H04L 9/3236 |
| 9,860,677 B1* | 1/2018 | Agerstam | ............... | H04W 4/70 |
| 9,922,178 B2* | 3/2018 | Mikhailov | ............... | H04L 9/3247 |
| 9,942,042 B1* | 4/2018 | Friedman | ............... | H04L 9/321 |
| 10,148,506 B1* | 12/2018 | Anburose | ............... | H04L 41/0853 |
| 10,291,477 B1* | 5/2019 | Askar | ............... | H04L 41/12 |
| 10,382,203 B1* | 8/2019 | Loladia | ............... | H04L 9/30 |
| 2005/0204148 A1* | 9/2005 | Mayo | ............... | H04L 63/0815 713/185 |
| 2007/0244578 A1* | 10/2007 | Stirbu | ............... | H04L 67/08 700/65 |
| 2008/0072301 A1* | 3/2008 | Chia | ............... | G06F 21/41 726/8 |
| 2010/0153726 A1* | 6/2010 | Liu | ............... | H04L 9/083 713/171 |
| 2010/0164693 A1* | 7/2010 | Zhang | ............... | H04L 12/2809 340/10.31 |
| 2014/0359131 A1* | 12/2014 | Seed | ............... | H04L 67/1031 709/226 |
| 2015/0134954 A1* | 5/2015 | Walley | ............... | H04W 12/069 713/168 |
| 2016/0065653 A1* | 3/2016 | Chen | ............... | G06F 3/0484 715/735 |
| 2016/0085594 A1* | 3/2016 | Wang | ............... | G06F 9/5077 709/226 |
| 2016/0366102 A1* | 12/2016 | Smith | ............... | H04L 9/088 |
| 2016/0366183 A1* | 12/2016 | Smith | ............... | H04L 63/06 |
| 2016/0366188 A1* | 12/2016 | Smith | ............... | H04L 63/101 |
| 2017/0063798 A1* | 3/2017 | Lapidous | ............... | H04L 63/029 |
| 2017/0180277 A1* | 6/2017 | Brady | ............... | H04L 51/066 |
| 2017/0289769 A1* | 10/2017 | Ceker | ............... | G06F 16/9537 |
| 2018/0007033 A1* | 1/2018 | Ajitomi | ............... | H04L 63/0823 |
| 2018/0025148 A1* | 1/2018 | Jain | ............... | G06F 21/34 713/166 |
| 2018/0034714 A1* | 2/2018 | Zhang | ............... | H04L 41/0806 |
| 2018/0102916 A1* | 4/2018 | Chen | ............... | H04L 67/303 |
| 2019/0014117 A1* | 1/2019 | Li | ............... | H04L 67/42 |
| 2019/0387458 A1* | 12/2019 | Li | ............... | H04W 4/70 |
| 2020/0412796 A1* | 12/2020 | Seed | ............... | H04L 67/10 |

OTHER PUBLICATIONS

"OCF Security Specification V1.0.0", Open Connectivity Foundation (OCF), (Mar. 22, 2017), 104 pgs.

* cited by examiner

SCALABLE AND SECURE RESOURCE ISOLATION AND SHARING FOR IOT NETWORKS

PRIORITY APPLICATION

This application claims the benefit of priority to U.S. Application Ser. No. 62/530,662, filed Jul. 10, 2017, which is incorporated herein by reference in its entirety.

TECHNICAL FIELD

Embodiments described herein generally relate to interconnected device networks, and in particular, to techniques for establishing connections and implementing functionality among Internet of things (IoT) devices and device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
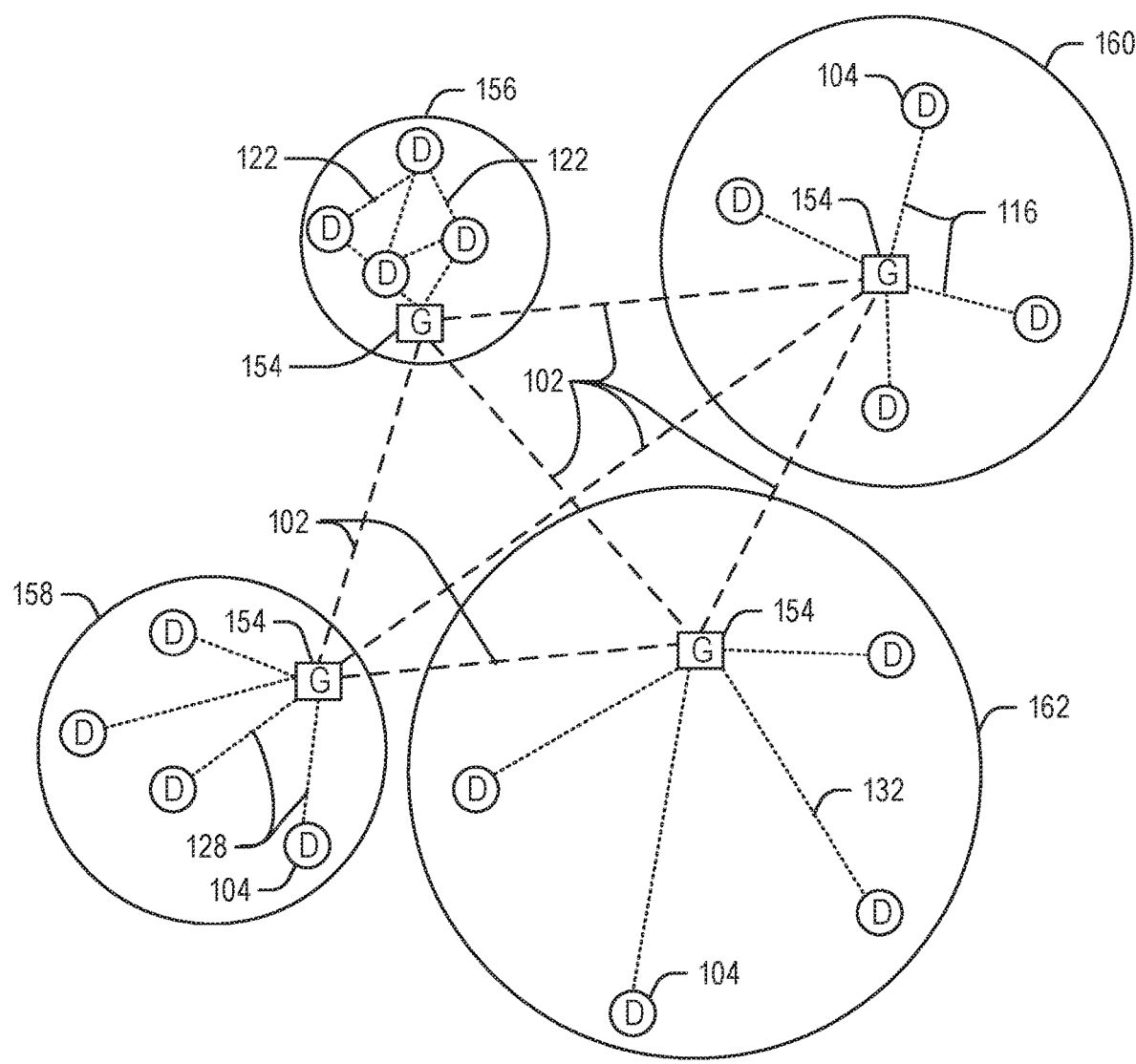
FIG. 1 illustrates an domain topology for respective Internet-of-things (IoT) networks coupled through links to respective gateways, according to an example.

In the following description, methods, configurations, and related apparatuses are disclosed for scalable and secure resource isolation and sharing approach for networks of IoT devices, including approaches for exposing aspects of cloud computing using an IoT framework and resource model abstractions. The approaches discussed herein leverage an abstractive "service" (e.g., an "OCF Service") to redefine an IoT resource model operating in the cloud (e.g., a remote network).

As discussed herein, the following techniques enable a scalable architecture for IoT resource management in local and cloud environments. This provides a number of benefits, including secure IoT resource isolation and sharing in such local and cloud environments. As discussed herein, this architecture may be implemented through use of: a service delegation function that may issue and revoke services using a credential issuance and revocation mechanism; a service description method that follows an IoT resource model (such as OCF) where a service is described using the resource model such that there is no need for an alternative description language, tools, and ecosystem; a cloud service that facilitates remote access via operation of the cloud service within a common domain, but where an access control mechanism will identify both the cloud service (proxy) and the endpoint devices seeking to interact; and, a cloud collaboration service that facilitates discovery and trust establishment across domains such that foreign devices may dynamically establish grounds for interaction across domain (inter-domain) boundaries. Accordingly, this architecture allows local devices to roam into other networks but retain local network context; this architecture also enables increased dynamism among IoT devices and networks.

As discussed herein, various operational models used in IoT networks may be extended for use in the present scalable architecture. For instance, a model for IoT capability composition may be enabled such that simpler IoT "objects" may be defined and serve as "core" or "foundational" components of IoT nodes. Core objects may have security functionality including "root-of-trust" functionality. Core objects may be dynamically "augmented" with non-core objects to construct more functional and sophisticated features. Additional aspects of delegation, inheritance, core functionality, security, and attestation may be implemented within these objects, to accomplish efficient resource isolation and sharing.

In a further example, an "OCF Service" object is provided for use in an OCF IoT network implementation, with such OCF Service object being composed of a "device" object to address the complexity caused by IoT nodes needing to behave as both Server and Client. This OCF Service object contains both traditional OCF "Resources" and "Transactional Resources". OCF server and OCF client abstractions may further be ascribed to an OCF Service where an expectation of "publisher", "subscriber" and "controller" are further applied. For instance, concepts of a "bridge" object, a "virtual device object", a "cloud" object, and a "collaboration cloud object" may be represented.

Use of an "OCF Service" as discussed herein may involve a combination of resources and normative behaviors that provide sequences of OCF message exchanges to accomplish defined administrative or operational objectives. One or more OCF Services may be hosted on an OCF Device. OCF Services implement the functions of both an OCF Server and an OCF Client and may implement OCF Intermediary functions. Authorization to perform an OCF Service may be achieved through issuance of an authorization credential containing an OCF Role. Normative behaviors may be contained in an OCF "Transaction" or "script" resources. OCF devices with authorization to perform one or more OCF Services may dynamically instantiate (e.g., CREATE in a CRUD operation) the resources necessary to perform the duties of the OCF Service.

Based on this construct, an "OCF Cloud" (e.g., as defined by the OCF specification) may be based on an OCF Service and/or OCF Bridge abstractions. Unlike an OCF Bridge, however, the presently described OCF Cloud construct enables the OCF Device to be OCR-Cloud-Aware. For instance, Device Ownership Transfer Service ("DOTS" or "DOXS"), Access Management Service ("AMS"), and Credential Management Service ("CMS") are example implementations of OCF Services, allowing such OCF devices to be (at least somewhat) aware of the OCF Services in order to interact with them. For instance, in the case of an OCF Device in "Server-directed-mode", the OCF Device may also be adapted to become "Service-aware". These and other approaches for deployment of a manageable service are expressed in the following OCF network implementations and similar IoT network settings.

FIG. 1 illustrates an example domain topology for respective Internet-of-things (IoT) networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
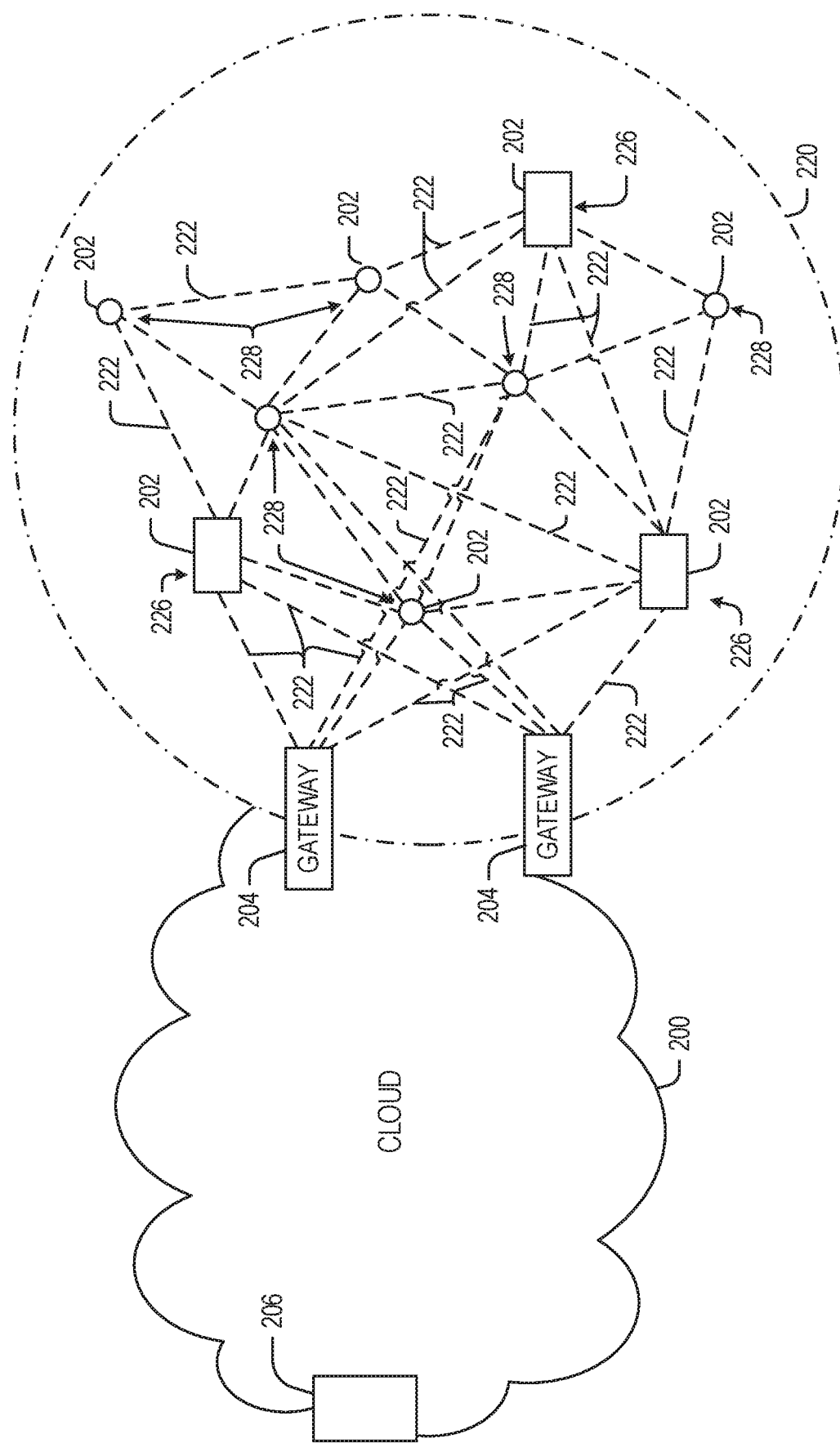
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of Internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi™) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the WEE 802.15.4 standard, such as Zigbee®. The respective IoT networks may also operate with use of a variety of network and Internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 12 and 13.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200, To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Existing types of IoT/control networks may be described in terms of interactions between three classes of IoT nodes: (1) sensor, (2) actuator, and (3) controller. This interaction model expects sensor behavior to be stereotyped as "publish-only"; actuator behavior as "subscribe-and-act-only"; and controllers to coordinate delivery of publications to subscribers and apply a variety of data transformations, filters, augmentations and monitoring in addition. However, this interaction model does not account for increasing sophistication of node functions (e.g., where additional control, sensing and actuating may be performed by the same node) nor does it anticipate the need for dynamic composition of new capabilities in addition to (or instead of) existing capabilities. Furthermore, this interaction model does not consider secure ways to achieve these goals. Using a current paradigm for IoT networks, it becomes difficult to connect various IoT devices together cohesively when devices may be very dynamic in terms of their function. Additionally, IoT networks rely on cloud-hosted services and cloud-hosted virtual devices that expose an interface to remotely (Internet) connected devices even though they are a member of the same logical network (referred herein to as a 'domain').

Many IoT frameworks have been proposed that provide various abstractions of IoT device connectivity and composition, such as Off, UPnP, OMA-DM/LWM2M and IPSO Alliance. The OCF architecture enables resource-based interactions among IoT resources such as, for instance, physical devices or applications having a logical (interoperable) data representation. The OCF resource model architecture leverages existing Internet (e.g., IETF) and industry standards (both wireless or wired) and manages information flow according to a quasi-RESTful (stateless connection) approach. Such an approach applies to security and device management as well. However, stateless and secure interactions, especially across bridged domain contexts, is especially difficult as security often relies on a security context in order to evaluate trust and risk.

IoT networks are commonly represented in these frameworks by a set building-block abstractions that may be composed and arranged, to result in new 'things' that 'inherit' or have preserved the properties of the abstract 'thing' they're constructed from. For instance, in the OCF framework, an OCF 'device' is an abstract 'thing' that has a set of security properties that are inherited among other 'things' such as a 'service', 'bridge' or 'cloud'. It may be appropriate to describe a 'service' as still another building block abstraction from which to construct a 'bridge' or 'cloud' (or something else). OCF defines the term "Server" and "Client" to represent the thing that 'hosts' OCF resources (the "Server") and the thing that interacts with OCF resources (the "Client"). For instance, it is assumed that a Client who knows how to interact with a "Lightbulb Resource" is "Lightbulb-aware" meaning the Client knows what "On" and "Off" means when it interacts with the On/Off property of the/Light resource. However, existing aspects of the OCF Device security model do not ensure the Client is 'aware' of the/Light properties other than to define an access control list (ACL) entry that allows the Client "Device" to interact with the Server "Device" and "Resource".

Use and modeling of a service as a building block for interaction among devices and a cloud service is not addressed by existing IoT implementations and specifications. For example, a service in the context of OCF may involve a set of resources that a Server hosts and a set of scripts/transactions that one or many Clients may execute. If a set of scripts/transactions are represented using an OCF resource, then that suggests (confusingly) that an OCF Client is intrinsically an OCF Server (since it hosts OCF resources). The client-server terminology begins to break down and so does the security modeling. With the present techniques, the idea of a 'Service' abstraction is adapted so that one or many OCF Devices may participate in the service as both 'clients' and 'servers' where each is aware of the existence of the resources required to perform the interactions. Not every Device needs to host every resource nor does every Device need to perform every script/transaction. Accordingly, the concept of a Service is addressed with the present techniques to enable each Device to perform some or all of the defined interactions according to a 'service' abstraction.

As discussed herein, security may be applied within an OCF Service by specifying which of the defined transactions and resources (defined under the particular type of service) are delegated to a set of OCF Devices. Delegation may be achieved by issuing credentials that identify the resources and scripts/transactions that each node is authorized to host/perform. Issuance of the credentials may be followed by creation of the needed resources. For example, a hosted resource and a script resource may be created by an administrative node (e.g., authorized to perform CREATE/DELETE operations) while participant nodes may not be authorized (e.g., not authorized to perform CREATE/DELETE operations) for specific resources. This configuration allows for controlled dynamic formation of IoT networks based on a 'service' abstraction.

In the context of many IoT deployments, cloud computing may serve as a highly efficient approach to hosting IoT device resources and services. Cloud computing capabilities may facilitate efficient discovery, distribution and management capabilities. However, existing IoT framework models do not embrace cloud services fully and fail to expose cloud computing using an IoT framework and resource model abstractions.

In existing OCF network implementations, OCF provides an abstraction "OCF Server-OCF Client" model used in management of OCF Devices. This model defines a 'Bridge' device that virtualizes the 'device' abstraction such that a virtual doppelganger device may be used to shadow a real device instantiation. The virtual device proxies device interactions with peer virtual devices hosted on the same 'bridge' device. This allows different IoT networks to be connected in a way that causes all devices to 'appear' to be native to their respective IoT networks. However, an OCF Bridge device does not anticipate bridging across cloud services. While it is reasonable to assume an OCF Device may be hosted on an Internet cloud service (e.g., AWS or another cloud service provider), this approach does not consider the security implications of hosting the bridge and virtual devices on, what is otherwise, a third party computer. In essence, the cloud is merely treated as someone else's computer in a foreign domain.

Additionally, conventional approaches to cloud hosting also assume that devices are 'cloud-aware' in that such devices know what services may be obtained via the cloud and may interact accordingly. However, it is often unclear whether the services provided by the cloud computers are assumed to be trusted by all other IoT domains. Such assumptions lead to an expectation of centralized trust, which has been proven to be a naïve trust model that does not naturally exist. Accordingly, existing approaches do not provide an efficient and secure solution for exposing an IoT resource model that both provides domain isolation and inter-domain sharing in a trustable way.

The techniques discussed herein may be applicable to address these and other limitations of conventional IoT network configurations, through a 'Service' object-based construct. In an example, techniques are discussed for models of IoT capability composition that are forwarded such that simpler IoT 'objects' may be defined and be 'core' or 'foundational' components of IoT nodes. Core objects may have security functionality including 'root-of-trust' functionality. Core objects may be dynamically 'augmented' with non-core objects to construct more functional and sophisticated. Delegation is defined such that object composition is controllable through a system of roles and profiles. Composite-objects retain core functionality so that the composite object can inherit core object functionality and security properties. As such, a core object built around a hardware root-of-trust may be part of a composite object that retains the security properties of the hardware root-of-trust. For example, if device attestation is a capability of a core object, then a composite object retains device attestation functionality even though it is composed of additional functionality.

In an example applicable to an OCF network implementation, an "OCF Service" object is defined to be composed of an OCF 'Device' object. The OCF Service object may be further represented as an OCF 'Collection' resource consisting of both traditional OCF resources and transactional resources where the collection resource has a resource type (RT) value that may be used with a credential structure supporting roles, such as an X.509v3 certificate or an OCF credential resource. The RT value is used to delegate the privilege of functioning in the capacity of an OCF Service (for example "oic.svc" is a service role and "oic.sec.svc.cms" is a security service role, specifically in a credential management service (CMS)). OCF Server and OCF Client abstractions may further be ascribed to an OCF Service object where an expectation of 'publisher', 'subscriber' and 'controller' are further applied.

As discussed herein, a 'Bridge' object-based construct is adapted to host multiple 'virtual' devices, as the bridge is composed of (and inherits from) both a 'Service' object and a 'Device' object. The concept of a virtual device object is also provided to inherit from the device object but is composed of another virtual device object and a real device object. The concept of a 'Cloud' object-based construct (e.g., a "Cloud Service" or "CS") is also defined to compose a 'Services' object that may host or supply additional services commonly found among web hosting environments in the cloud such as OAuth2 and OpenID-Connect services. The concept of 'Collaboration Cloud' object-based construct (e.g., a "Collaboration Cloud Service" or "CCS") is also defined to compose a Cloud Service object that performs a discovery service duty such as DNS-based Authentication of Named Entities (DANE) or a Rendezvous Service and a key management service that proxies message exchanges between one or more domain-specific credential management services. Accordingly, with the adaptations and uses of the presently described Service object, various security properties and services may be defined to archive an efficient resource isolation and sharing.

For purposes of understanding the presently disclosed techniques, the following overview of an example OCF network implementation is provided. It will be understood that variations to the following network implementation and components, and the use of additional or alternate network components in a variety of IoT standards, are within the scope of the present disclosure.

In an example, an OCF Service is defined to provide an abstraction of a resource. The Resource owner defines different OCF services in the Cloud or on OCF Devices. The OCF Service running in the Cloud may be a Cloud tenant, as it acts as a 'Shadow' of the resource. Leveraging isolation technology of tenants in the Cloud, a resource owner may deposit a resource into the Cloud securely by enabling or utilizing a Trusted Execution Environment (TEE) (such as Intel Software Guard Extensions (SGX) or ARM TrustZone). Accordingly, the techniques discussed herein introduces instances of the OCF Service to achieve secure resource sharing among different resource owners. The following examples are provided of such implementing services and service instances.

Figure 3:
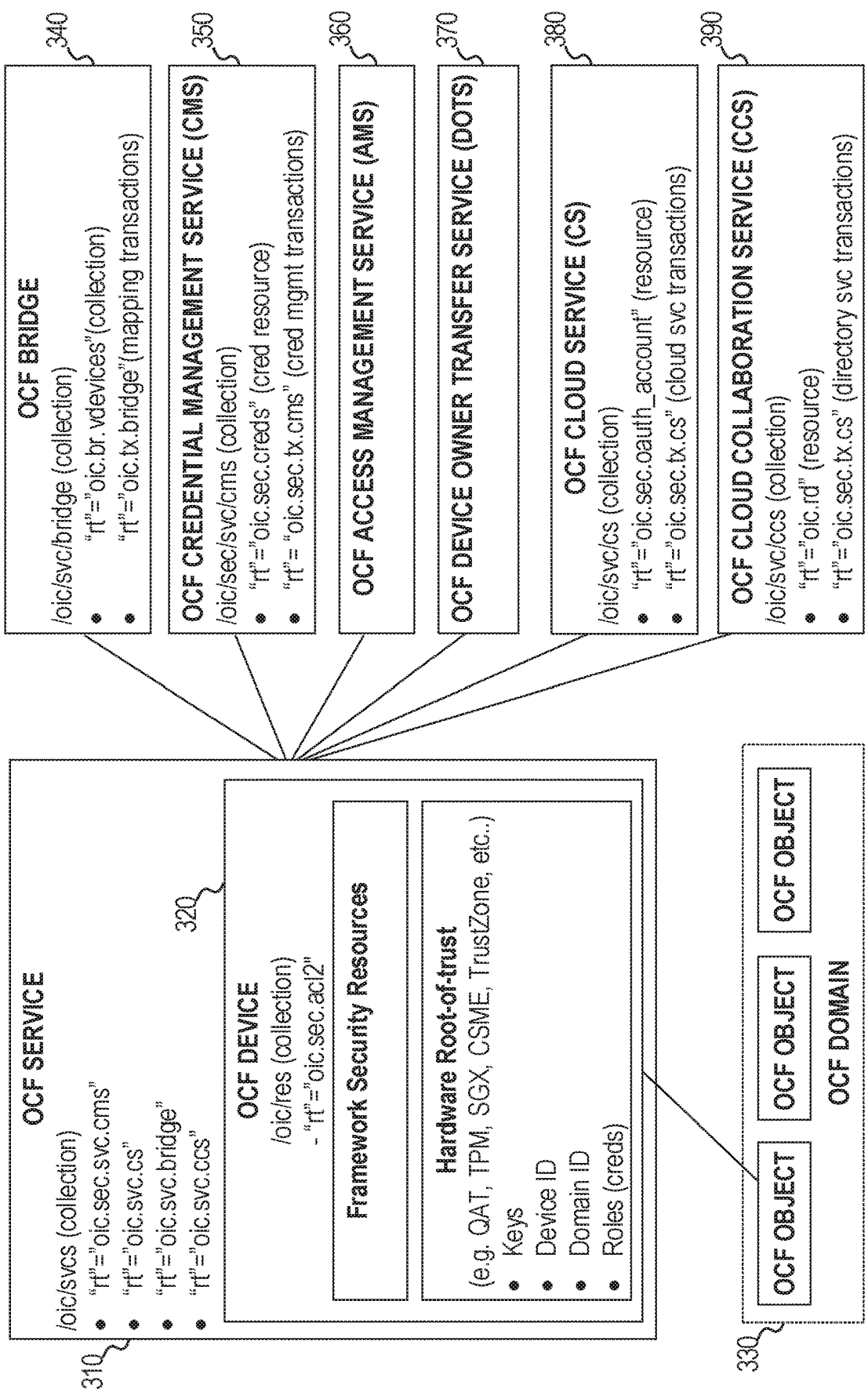
FIG. 3 illustrates a block diagram of an OCF composition object model, according to an example.

FIG. 3 illustrates a block diagram of an OCF composition object model, according to an example. In an example, the OCF composition object model may provide OCF Service objects, shown by OCF Service object 310, being composed of an OCF Device object 320. In an example, the OCF Device object 320 is further composed of a Hardware Root of Trust, which may be implemented in a secure mechanism such as Intel SGX, Intel QuickAssist Technology (QAT), Intel Trusted Platform Module (TPM), or ARM TrustZone.

The OCF Service object 310 enumerates the set of services that a particular device is hosting. Six services are depicted in FIG. 3: OCF Bridge 340, OCF Credential Management Service 350, Access Management Service (AMS) 360, Device Owner Transfer Service (DOTS) 370, OCF Cloud Service (CS) 380, and OCF Collaboration Cloud Service (CCS) 390. Other services may include other forms of discovery, configuration, setup, software update and device management, remote connectivity or security management services. The OCF Device object 320 also is represented as an object within a OCF Domain 330 (e.g., a collection of objects in a network topology), as the OCF Device object 320 defines resource isolation and sharing capabilities for use within the domain 330.

OCF Service: An OCF Service 310 embodies a combination of resources and normative behaviors that may include sequences of OCF message exchanges that accomplishes defined administrative or operational objectives. One or more Services may be hosted on an OCF Device 320. OCF Services 310 implement the functions of both OCF Server and OCF Client and may implement the OCF Intermediary function. Authorization to perform an OCF Service 310 is achieved through issuance of an authorization credential containing an OCF Role. Normative behaviors may be contained in an OCF "Transaction" resource. For example, an OCF Service 310 may include a collection resource where the "RT" name is "rt"="oic.sec.svc.cms". The OCF Service 310 may have at least one property 'p' that lists the resources to be hosted. Furthermore, a resource of type " . . . svc . . . " may be dynamically instantiated within the OCF resource model by using either a CREATE or UPDATE message structure. In such an example, CREATE implies the creation of an OCF Service resource (of type OCF Service) which is an OCF Collection resource; and UPDATE implies addition of a OCF Service resource to an existing resource that has a reference to another OCF resource as one of its properties (where the resource added is itself an OCF Service resource).

OCF Service creation may be further described by the issuance of a roles certificate (e.g., X.509, OCF/cred resource, OAuth2 AUTH_CODE, etc.) with such certificate containing a description of an OCF Service resource type structure where the resource type is interpreted as the intent to delegate the privilege of operating in the capacity of an OCF Service. The lifecycle of the credential, for example, may be interpreted as the validity period in which the OCF object may operate in the OCF Service capacity and where a re-issuance of the credential implies the intent of re-authorizing the object to continue operating in the capacity of the named OCF Service 310.

Credential Management Service (CMS): CMS (e.g., OCF CMS 350) is an OCF Service of type "rt"="oic.sec.svc.cms"; which takes the responsibility of device credential provisioning and management. For example, an OCF CMS 350 may directly provision credentials to an OCF Credential resource (e.g., /oic/sec/cred) or may generate tickets for the purpose of enabling an OCF Device 320 to present a ticket to another OCF Device 320 where the ticket may be authenticated to the CMS as its originator and where a secure key exchange may follow (e.g., Fluffy's miniticket). CMS 350 implements a set of transactions (message exchange sequences) that may be expressed as a Tx Resource that implements a series of key management objectives (e.g., Fluffy) including key generation, update, and revocation. CMS hosts a list of devices that it manages and the credentials that it maintains for each device (such as oic/sec/cred resource) and revoked credentials (such as /oic/sec/crl resource).

Access Management Service (AMS): AMS (e.g., OCF AMS 360) is an OCF Service of type "rt"="oic.sec.svc.ams" that implements an access management capability where a maintenance of /oic/sec/acl, /oic/sec/acl2, /oic/sec/amacl, /oic/sec/sacl or other similar access control entry resource may be managed by an AMS. The AMS may be delegated and may be dynamically instantiated.

Device Owner Transfer Service (DOTS): DOTS (e.g., OCF DOTS 370) is an OCF Service for device owner transfer and device onboarding that supports the introduction of devices into a domain and onto a local network. The creation, instantiation, and delegation of said service may operate according to existing OCF specification implementations.

Cloud Service (CS): The CS (e.g., OCF CS 380) is an OCF Service that is hosted on a cloud hosting platform and that interacts with other cloud entities, for example an OAuth2 authorization server or a social media (e.g., Facebook) server, or the like. The CS is used to proxy connectivity between local OCF devices and remote OCF devices (e.g., those not connected via a local network). The creation, instantiation, and delegation of said service may operate according to existing OCF specification implementations and the techniques discussed herein.

Cloud Collaboration Service (CCS): CCS (e.g., OCF CCS 390) is an OCF Service that facilitates introduction of an OCF object (OCF devices, services, bridges, or the like) to other devices, services, bridges, etc., which may exist across domain boundaries. Foreign OCF Services may register their intention to be discovered by another domain by creating a resource directory of domain resources in a CCS service. CCS may leverage, for example, a DANE discovery service or other discovery mechanism.

Bridge: A bridge (e.g., OCF Bridge 340) is an OCF Service that is used to host a collection of multiple 'virtual' devices. The bridge may be composed of—and thus inherits properties from—both of a 'Service' object and a 'Device' object. As a result, the Bridge service is designed to track a collection of virtual objects, as the Bridge maps transactions among various services and devices.

Domain: A domain (e.g., OCF Domain 330) is a logical representation of a context in which a set of OCF Devices (Services and/or Resources) may exist such that they are 'owned' by the domain. The act of 'onboarding' a device into the Domain suggests the device establishes a trust relationship with a DOTS such that it allows the DOTS to configure it to be managed, controlled and provisioned by other members of the Domain. A domain context may also be used to establish a trust relationship between a second domain where a CMS, DOTS, or other Trust Management Service dynamically negotiates a trusted relationship using available context and appropriate cryptographic key exchange so as to disambiguate the domains involved as well as anything not intended to be involved. This may be achieved by using a security mechanism such as Intel Enhanced Privacy ID (epid), Signed Diffie-Hellman, E-SPEKE (Simple Password Exponential Key Exchange) (or a related PIN-based exchange), certificates and other context (e.g., location, organizational affiliation, reputation, association, or the like) so as to detect would-be interlopers. A Domain may have a unique identity such as a UUID; where the identifier is self-selected or may be chosen by an identity provider such as a DANE server, OAuth2 server or other method that is usable to disambiguate duplicates.

Figure 4:
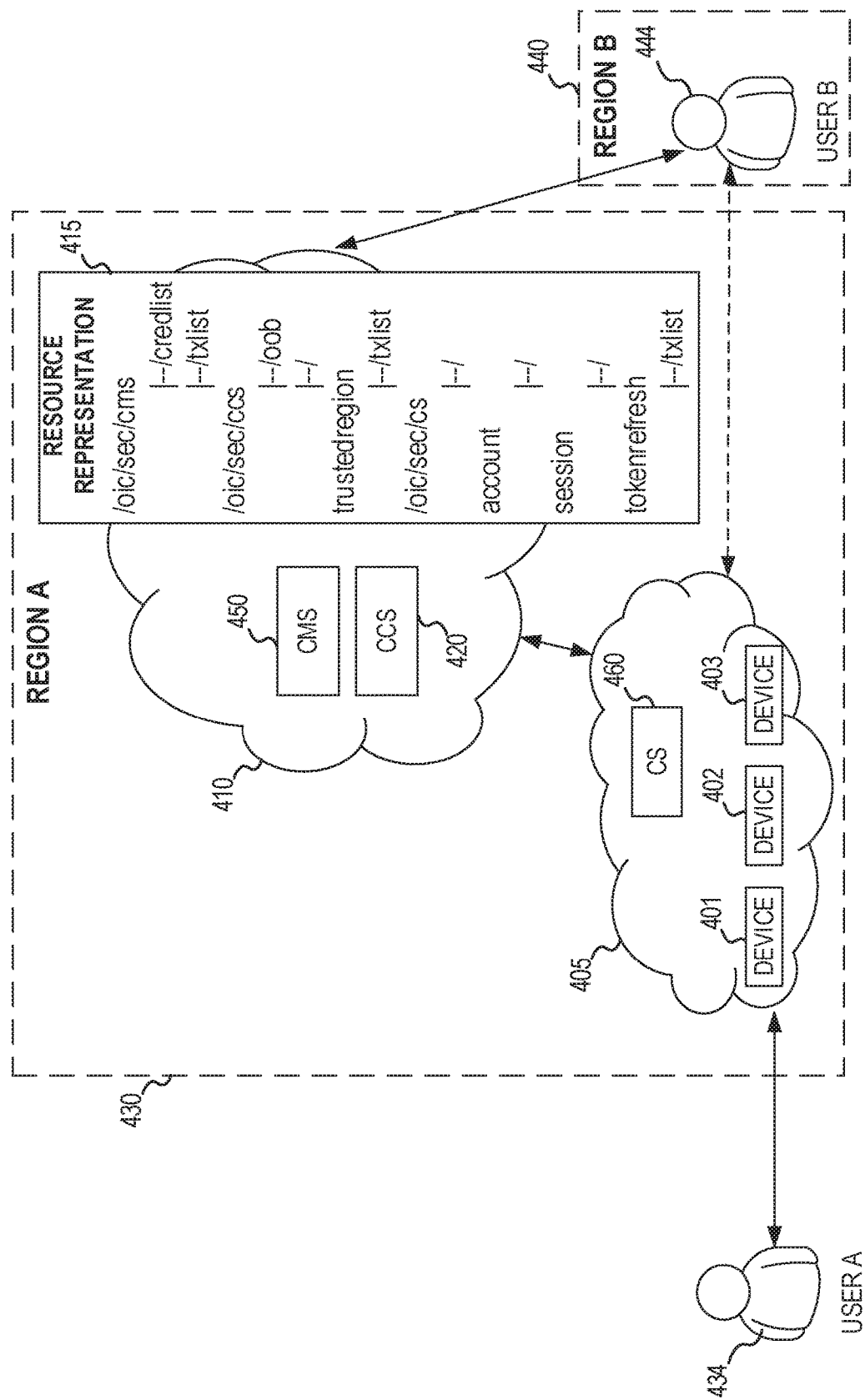
FIG. 4 illustrates a block diagram of a resource representation provided among users in multiple regions, according to an example.

FIG. 4 illustrates a block diagram of a resource representation provided among users in multiple regions. As shown, a Region A (corresponding to a Domain A 430) is defined for operation of devices and services in multiple networks 405, 410; a Region B (corresponding to a Domain B 440) is also defined for operation of devices and services in one or more networks (not shown).

In an example, a Cloud Service (CS) 460 operates in the first network 405 (e.g., as an OCF Service CS implementation hosted by one or more cloud servers), with this CS 460 being utilized by a number of devices (e.g., OCF Device 401, OCF Device 402, OCF Device 403). A CMS 450 and CCS 420 operate in the second network 410 (e.g., as OCF Service CMS and CCS implementation hosted by one or more cloud servers). In an example, a resource representation 415 (e.g., an OCF Resource) s established to define the parameters of operation for the OCF services including the CMS 450 and the CCS 420. Additional discussion of the roles of the CMS 450 and CCS 420 is provided in the examples of FIGS. 5 and 6.

The User A 434 operates to control the operation and use of the devices 401, 402, 403, and may define authorization policies or provide specific authorization actions for communications among devices within the region (e.g., within the region A corresponding to the domain 430). The User A 434 may also establish control to authorize resource actions and communications that occur within the region (Region B corresponding to domain 440) and between regions. This role is likewise performed by the User B 444 in within the region B corresponding to the domain 440. The operations to authorize the resource actions and communications may be defined in, and conducted according to, characteristics of a resource representation 415. For instance, the resource representation may define operational aspects of the CMS 450, the CCS 420, the CS 460, or other intra- or inter-region services.

Figure 5:
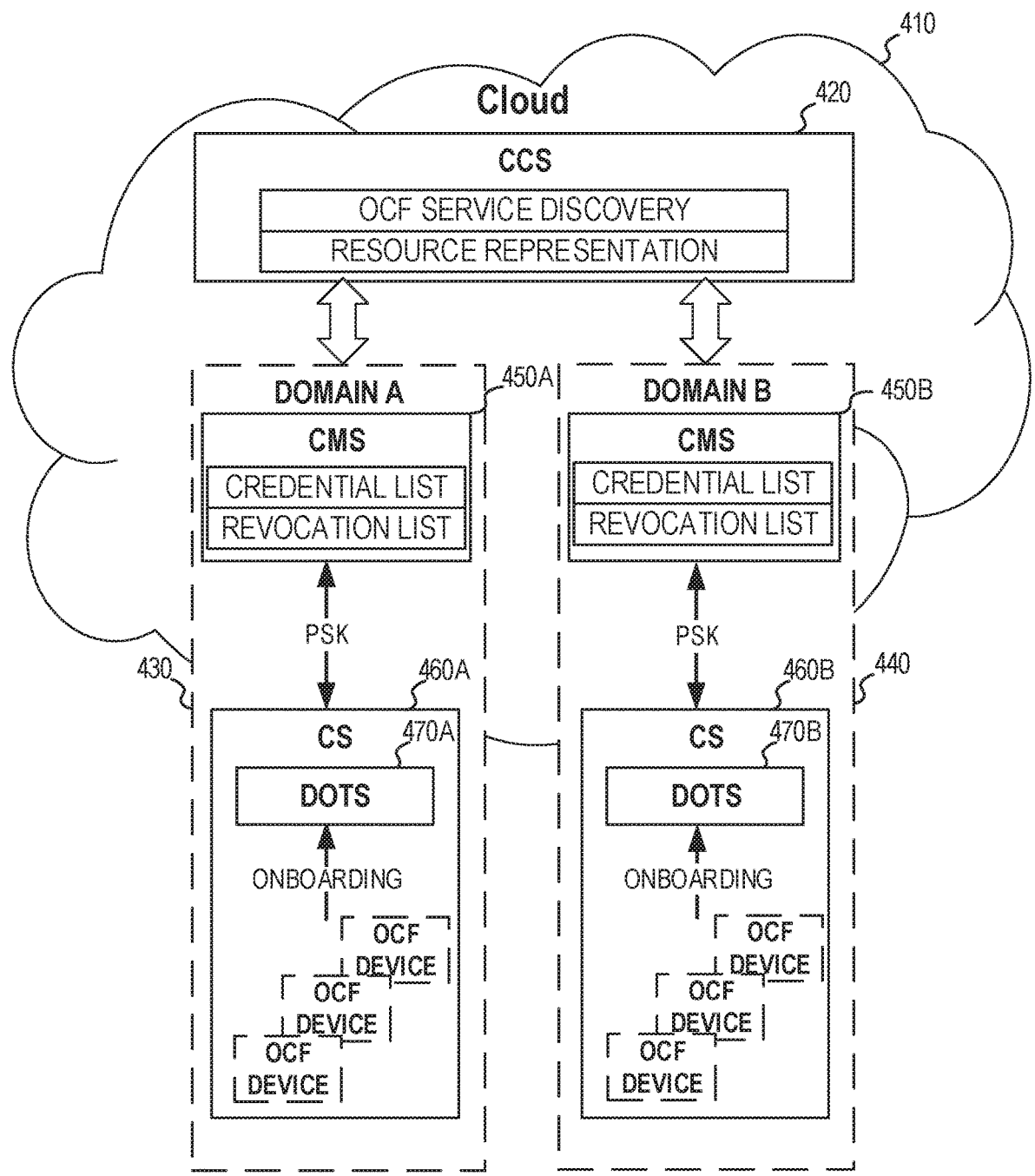
FIG. 5 illustrates an architectural overview of a resource isolation and sharing configuration among IoT devices in respective domains, according to an example.

FIG. 5 illustrates an example architectural overview of a resource isolation and sharing configuration among IoT devices in respective domains, implementing the techniques discussed herein. In the example of FIG. 5, Domain A 430 belongs to Resource Owner (RO) A. Domain B 440 belongs to RO B. CCS instance 420 is provided by a third party in the Cloud 410. Domain A 430 and Domain B 440 expose their shared resource to the CCS instance 420. Each domain contains services such as a CMS, DOTS, and several CSs (e.g., CS 460A, 460B). CMS instances (e.g., CMS 450A, 450B) provide secure key agreement and credential management. CS instances manage OCF devices and communicate with the Cloud 410 in the same domain.

There are three scenarios for communicating in this architecture:

(a) Pre-shared key setup: Before CS 460 connects to CMS 450 in its domain, the CS 460 may be provisioned a pre-shared key (PSK1) using an out-of-band method or PKI certificate as a credential.

(b) OCF device onboarding: Leveraging a DOTS, CS 460 registers a new OCF device into its domain in the Cloud 410 with the protection of PSK1.

(c) OCF device sharing: When a sharing request comes from another domain, such as a request received from Domain B 440 at a device in Domain A 430, the device first connects to CCS 420 to search and discover the resource from other domains, such as in Domain A 430. Using an out-of-band method such as OAuth2.0 protocol, Domain B 440 is assigned a credential from Domain A's resource owner such as a one-time password/token. Domain B 440 shows its valid credential to Domain A's CMS 450A and requests a service 'ticket'. Once Domain A's CMS 450 verifies the credential successfully, Domain A 430 and Domain B 440 may setup a secure channel (e.g., using a traditional DH/SIGMA key exchange). After the secure channel is setup, Domain A's CMS 450A chooses a key exchange protocol (such as fluffy), and generates a 'ticket' which contains a peer-to-peer session key for Domain B and the target CS (CS 460B). The ticket is protected by PSK1. Along with the ticket, a copy of the peer-to-peer session key is also assigned to Domain B 440 via the secure channel. Domain B 440 may access Domain A's resource by sending the ticket to corresponding CS of domain A.

Figure 6:
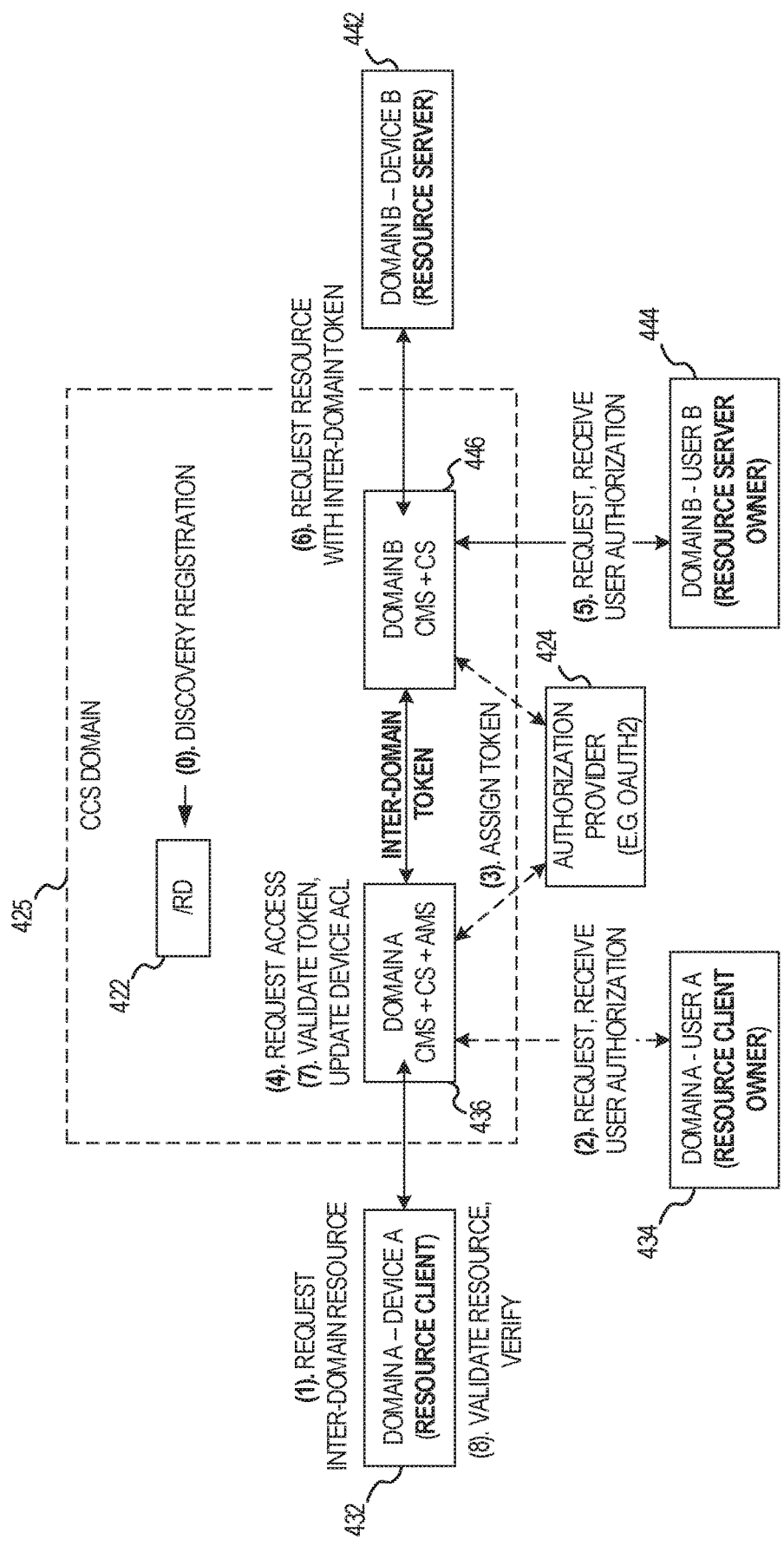
FIG. 6 illustrates a block diagram for communications exchanged among an inter-domain resource access architecture, according to an example.

FIG. 6 illustrates a block diagram for communications exchanged among an example inter-domain resource access architecture. Continuing from the example entities depicted in FIG. 5, the block diagram of FIG. 6 specifically illustrates a series of communication operations, exchanged among the domains (e.g., Domain A 430, Domain B 440, third party (CCS) Domain 425) and services (e.g., CMS, CS, AMS) and devices (e.g., Device A 432, Device B 442) within these domains. In various examples, the communication operations may be exchanged using any number of combinations of WC, Wi-Fi (IEEE 802.11), or Bluetooth communication standards, or other data exchange mechanisms such as QR codes, to transfer data among entities.

In FIG. 6, the sequence of operations to enable Device A 432 to access a resource at Device B 442 is performed as follows:

Operation (0): Domains A and B register with a CCS Resource directory 422 to be discoverable Domains. Inter-domain resource access may involve use of a CCS Domain 425 that maintains the resource directory 422 for discovery of Domains which permit some or all of a domain's devices and services to be available for use by a foreign domain.

Operation (1): A device (Device A 432) transmits a request for an inter-domain resource. For example, once discoverable, a foreign domain resource may be requested: (a) by forming an OCF request of the form GET "href"="<<foreign-domain-uuid><authority-device-uuid>: <resource-path>"; or (b) by querying a directory resource that, given an input <authority-device-uuid>:/<resource-path>, returns a redirection href value, and where the redirection href, when used, instructs an intermediary node to route or open a connect to a <foreign-domain-uuid> and submits a request using an <authority-device-uuid>:/<re-source-path> meaningful to the foreign domain.

Operation (2): Request user approval to use the Inter-domain Token to access the resource. The request is sent to a Domain-A Cloud Service that recognizes the CS of the intended foreign domain and may discover a policy that requires a user authorization via an OAuth or similar authorization service. This user authorization may be requested and received from the resource owner (e.g., User A 434).

Operation (3): Assign Inter-Domain Token. An authorization provider 424 issues an inter-domain token authorizing Device A of Domain A (device 432) to access a Resource on Device B of Domain B (device 442).

Operation (4): Request access to the Inter-domain resource. Domain A CS (e.g., one of the Domain A Services 436) proxies the request to the Domain B CS (e.g., one of the Domain B Services 446). The request sent to the Domain B CS is accompanied by the inter-domain token.

Operation (5): Request user approval to use the Inter-domain Token to access the resource. Domain B CS may have a policy requesting User B approval to allow Device B to serve resources to a Domain A requester. This user authorization may be requested and received from the resource owner (e.g., User B 444) in a similar fashion as in Operation (2).

Figure 7:
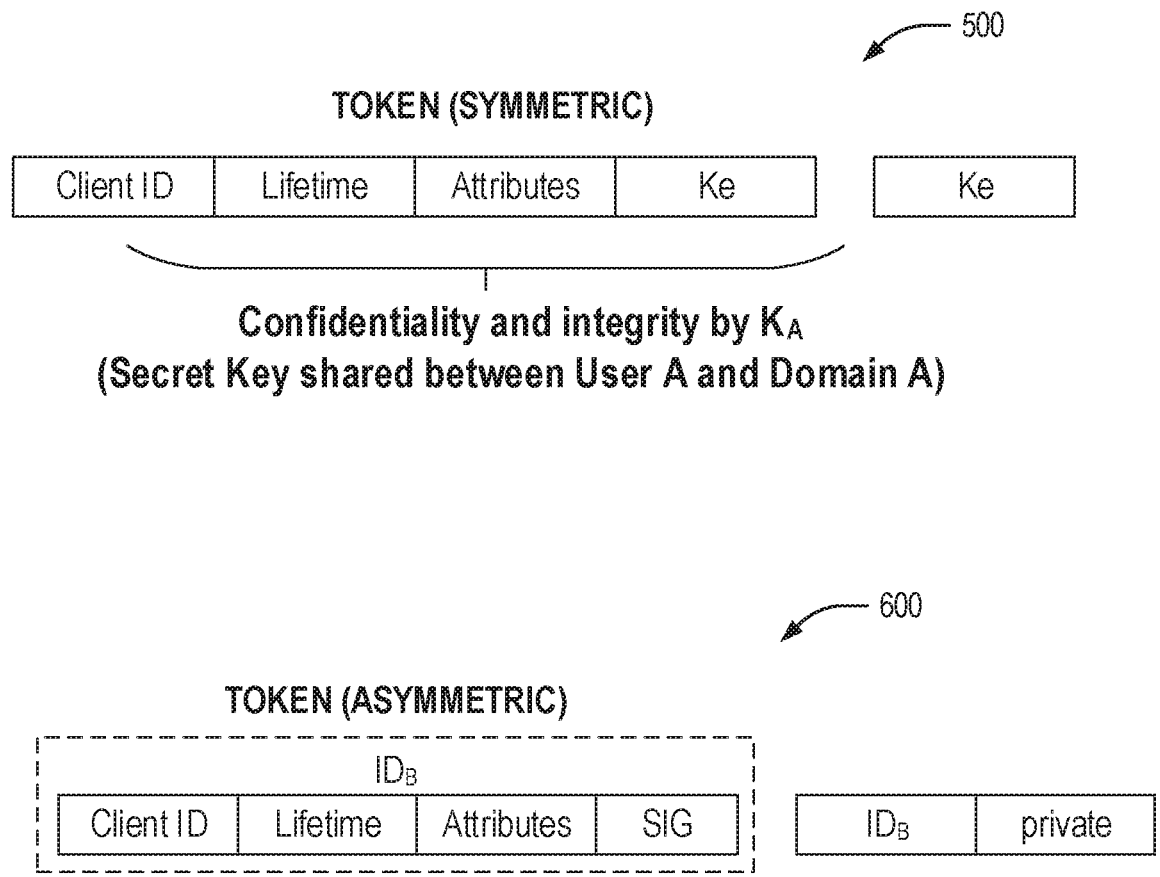
FIG. 7 illustrates a diagram of token contents for use in an inter-domain exchange, according to an example.

Operation (6): The request for the resource, which includes the inter-domain token, is provided to the Device B 442 that serves as the resource server. Device B 442 protects the resource content using, for example, a public key or shared symmetric key known to Device A 432, which is included in a request ticket that provides the inter-domain token. Further example formats of the token are illustrated in FIG. 7.

Operation (7): Validate Token, Key agreement and update Device A ACL for Device B Access. Domain A CMS verifies the token and ticket are authentic and issues Device B 442 a ticket, allowing Device A 432 to securely respond to Device B 442 (for example, to supply an ACK message).

Operation (8): Validate Resource, and Verify Transaction. Device A validates Resource data (using token and tickets issued by or endorsed by each CMS (A and B)). In response to successful validation and verification, the Device 432 then consumes the Resource from the Device 442 according to application needs.

In a further example, the communications to the Devices 432, 442 may occur with use of 'shadow' devices (not depicted); also in a further example, the devices 432, 442 may themselves operate as shadow devices. For instance, shadow devices may operate as front-end application (e.g., logical or virtual devices) to the actual physical devices that are hosted inside a local network or inside another cloud hosting environment. In an example where either or both of the Devices 432, 442 are 'shadow' devices, the devices may agree to use a message or session encryption key that provides end-to-end protection through the shadow devices to the actual devices.

Also in a further example, a shadow device may serve as a cryptographic endpoint for the communications between the Devices 432, 442, such that messages to the shadow device are encrypted with a first domain key and re-encrypted for use in a second domain with a second encryption key. The shadow device may rely on 'hardware' protection of keys by virtue of the host platform having TEE technology that is partitioned (e.g., isolated) to the respective domains, so that a malicious shadow device is not able to use a third party hosting platform to obtain information about another domain's keys. For instance, with this configuration, a shadow device operating on a first domain TEE hosted by a third party shadow device hosting service would be unable to perform side-channel attacks on the keys of a second domain TEE hosted by the same shadow device hosting service.

FIG. 7 illustrates a diagram of token contents for use in an inter-domain exchange, according to the techniques and architecture depicted in FIGS. 3 to 6. Specifically, FIG. 7 depicts examples of token contents 500, 600, for respective symmetric and asymmetric tokens which contain the 'ticket' data that may be used to protect resources. In the respective tokens, the ClientID may be inclusive of the Domain and Device identifiers. Keys may be specific to inter-domain use so that a message intended for local use only might not accidently be protected with a key designed for inter-domain use.

Figure 8:
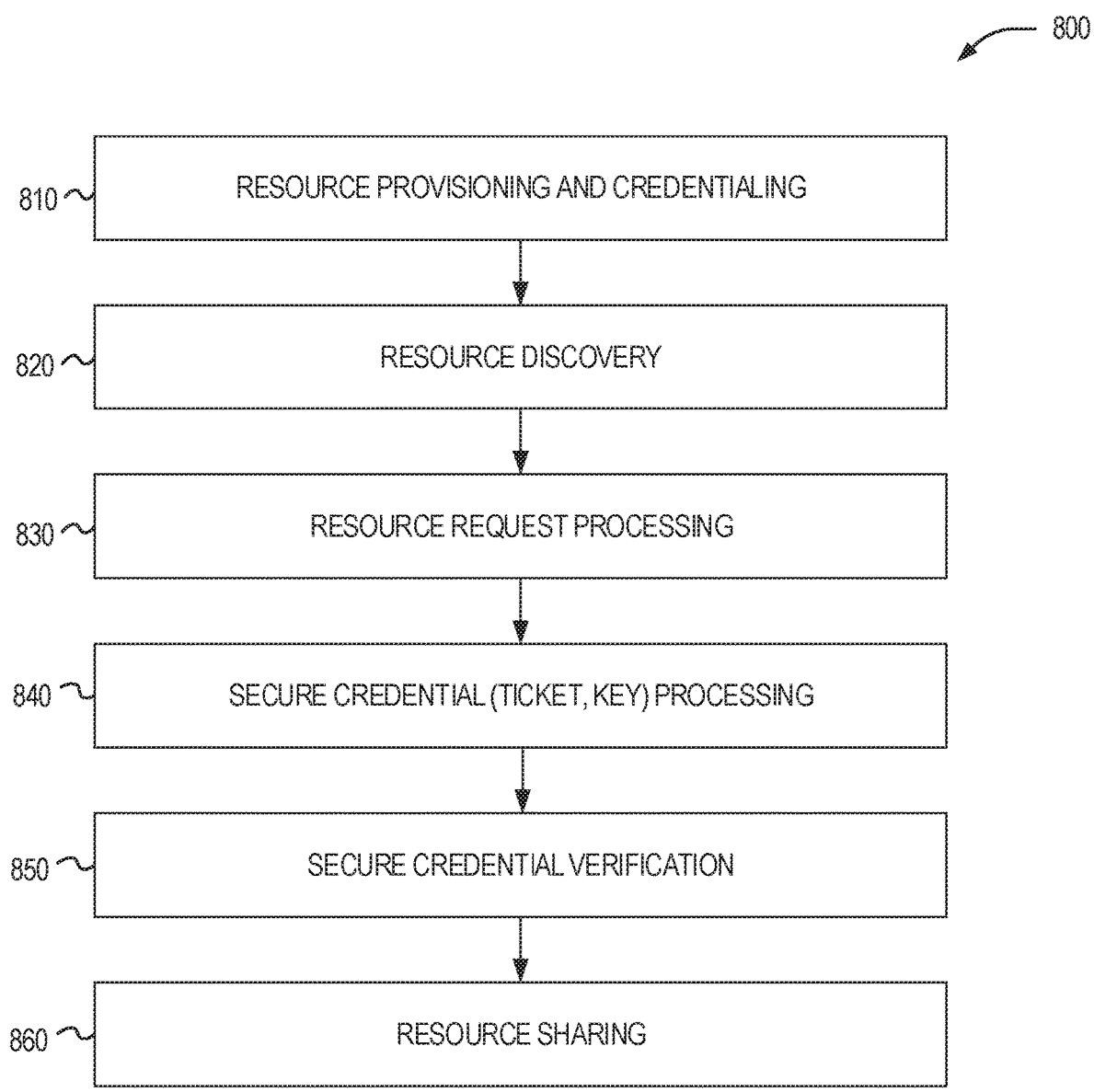
FIG. 8 illustrates a flowchart of processing phases for resource sharing with a service, according to an example.

FIG. 8 illustrates a flowchart 800 of example processing phases for resource sharing with a service, using the techniques discussed herein. As shown, the phases depicted in the operations of the flowchart 800 include the sequence of: resource provisioning and credentialing (phase 810); resource discovery (phase 820); resource request processing (phase 830); secure credential (e.g., ticket, key) processing (phase 840); secure credential verification (phase 850); and finally, resource sharing (phase 860).

Figure 9:
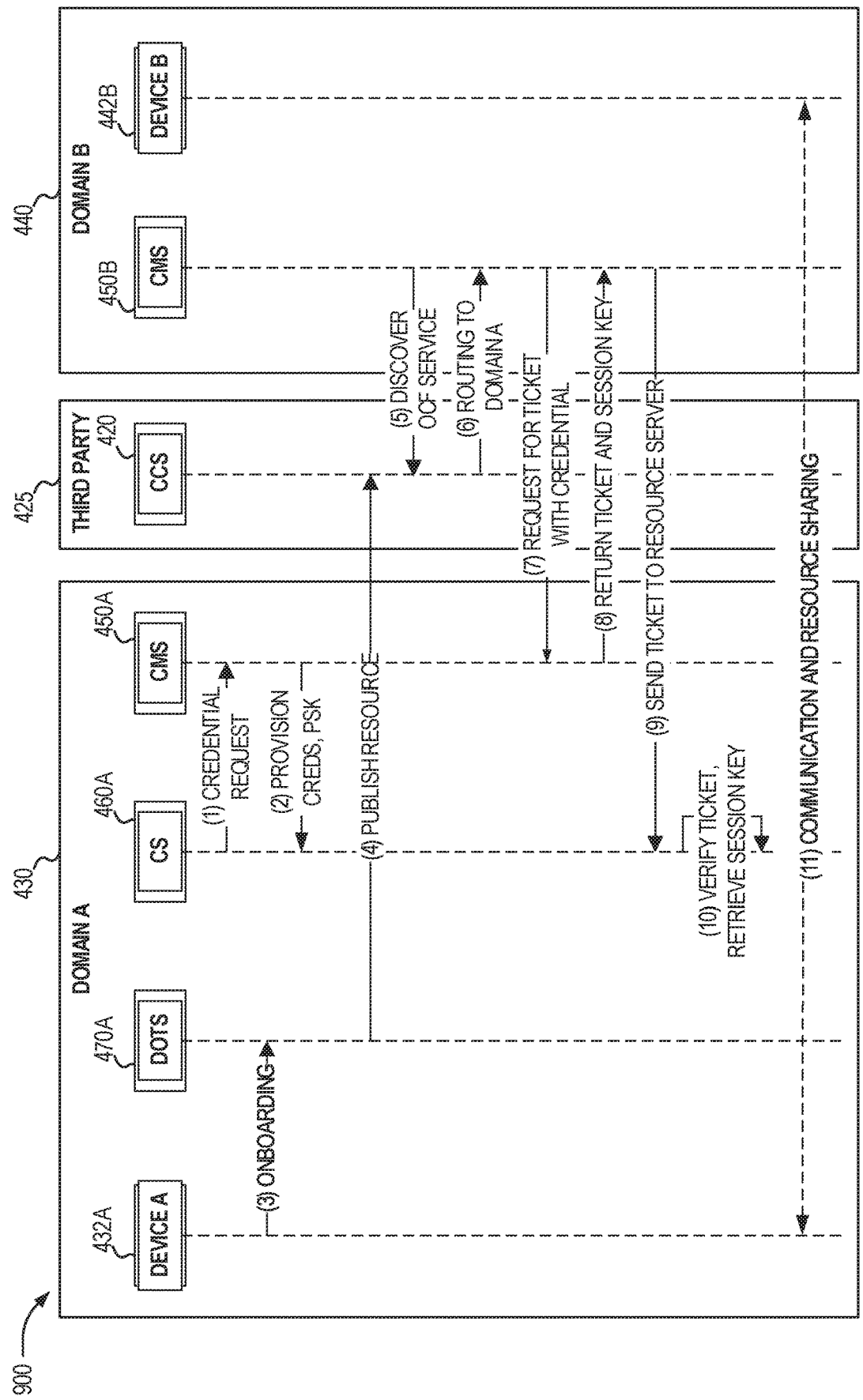
FIG. 9 illustrates a flow diagram for implementing device sharing between two domains, according to an example.

FIG. 9 illustrates a sequence diagram 900 for implementing device sharing between two domains, according to the techniques and architecture depicted in FIGS. 3 to 8. As shown, interaction occurs among the services in each domain to ultimately establish communication and resource sharing between devices in separate domains. Specifically, the sequence diagram 900 illustrates a scenario where the device in Domain B 440 identifies and requests a resource made available by the device in Domain A 430.

As a pre-requisite to the operations depicted in FIG. 9, a prerequisite function may establish trust in the CCS instances used by each of Domain A and B. Trust establishment may be achieved through attestation, introduction, reputation or other techniques as suggested herein. Trust establishment means that the respective domains will trust the CCS of the third party domain to perform the CCS functions correctly. The trust establishment need not imply trusting the CCS with the possession and manipulation of Domain-A specific or Domain A-B shared data, although trust establishment implies the need to protect the data between endpoints (with confidentiality and integrity) such that a CCS is not privy to sensitive objects and resources.

The operations depicted in the sequence diagram 900 of FIG. 9 include the following:

Operation (1). In domain A 430, CS A 460A utilizes an out-of-band credential (e.g., a PKI cert/password), establishes a secure channel with CMS A 450A (e.g., located in the Cloud), and issues a request for the credential provisioning (e.g., symmetric session keys in fluffy protocol).

Operation (2). In domain A 430, CMS 450A provisions the pre-shared key into CS 460A.

Operation (3). In domain A 430, a device (OCF Device A 432A) performs onboarding via DOTS 470A.

Operation (4). In domain A 430, CS A 460A publishes the OCF device resource model of the device (OCF Device A 432A) to a CCS 420 in the Cloud. In an example, the CCS 420 may also be regarded as operating in a third party Domain 425; the same requirements to establish trust with the first Domain 430 and the second Domain 440 may be required to also establish trust with the service provided by the CCS 420. In this case, the trust establishment flows between Domains A and B 430, 440 are recursive in nature being applied to the third party Domain 425 by each of Domains A and B 430, 440.

Operation (5). Another device (device B 442B) in domain B 440 attempts to find a resource via the CMS 450B in domain B 440. The CMS 450B in the domain B 440 issues a query to the CCS 420 to discover available resources accessible in the Cloud.

Operation (6). CCS 420 (operating in the Cloud) performs routing to domain A 430 for CMS 450B in domain B 440.

Operation (7). CMS 450B in domain B 440 obtains a credential from the CMS 450A in domain A 430 (e.g., using an out-of-band method), and issues a request to the CMS 450A in domain A 430 for a service ticket using the credential.

Operation (8). CMS 450A in domain A 430 generates a session key and ticket and semis back to CMS 4509 in domain B 440 in secure channel (as established in Operation (7)).

Operation (9). CMS 450B in domain B 440 requests a resource and sends the ticket to the corresponding CS 460A in domain A 430.

Operation (10). CS 460A in domain A 430 verifies the ticket, and if valid, retrieves the ephemeral session key.

Operation (11). CMS 450B in domain B 440 distributes the session key to the CS (not shown) in domain B 440 that the device B 442B belongs to. With use of this session key, device A 432A and device B 442B may conduct communications and share a resource directly and securely.

For simplicity, in FIG. 9 the CS in domain B is not depicted, and the session key distribution from CMS 450B (in domain B 440) to a CS (in domain B 440) is not depicted. The device-to-device communication may occur between CS 460A in domain A 430 and a CS in domain B 440 due to devices that have very restricted resources and do not include encryption/decryption capabilities. For instance, in a smart home example, a CS maps to the gateway and a device maps to a smart device (e.g., a lightbulb).

Figure 10:
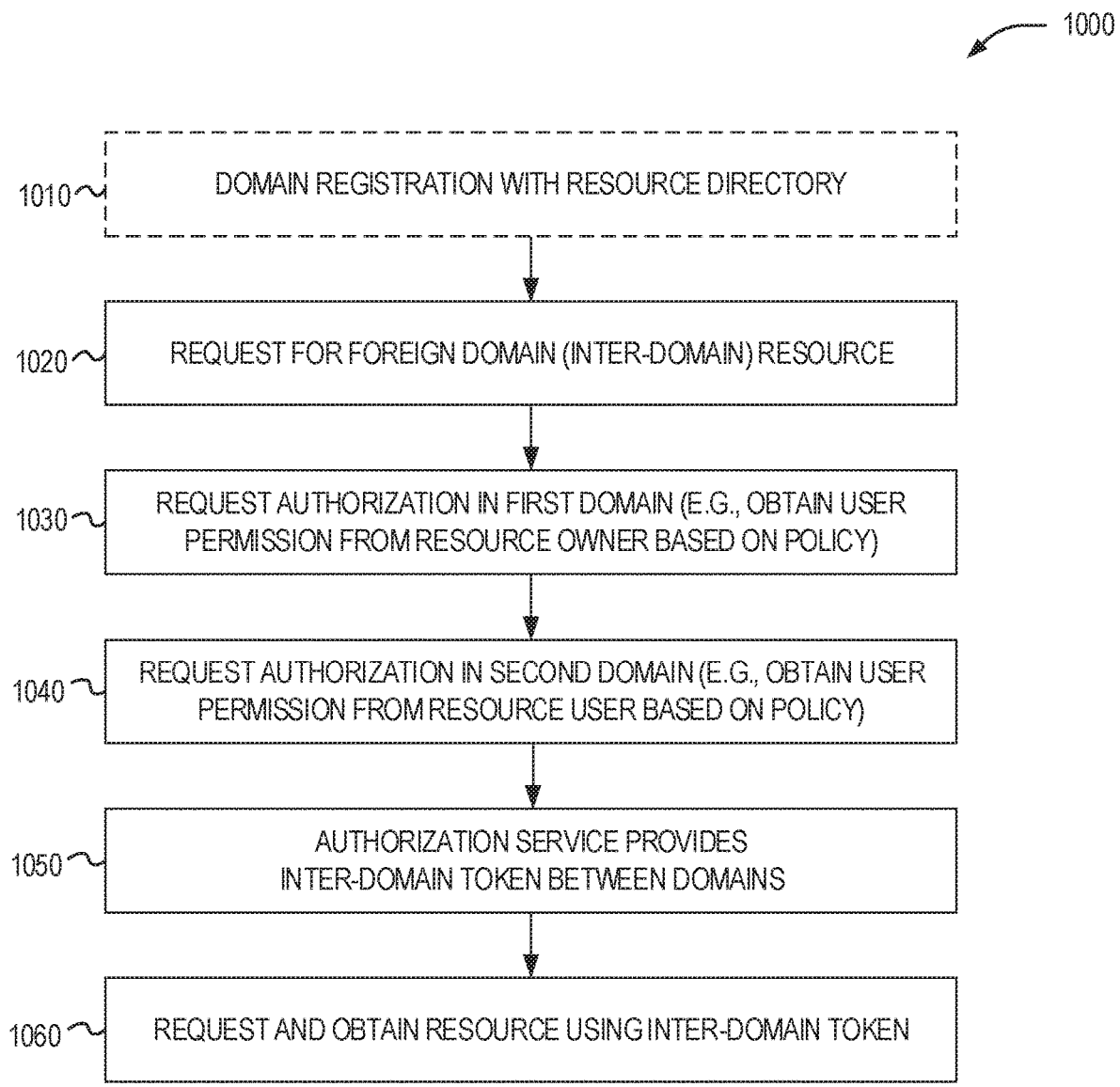
FIG. 10 illustrates a flowchart of an example technique for resource isolation and sharing by implementing a secure data exchange utilizing access control with an intermediary, according to an example.

FIG. 10 illustrates a flowchart 1000 of an example technique for resource isolation and sharing, by implementing a secure data exchange utilizing access control with an intermediary. As shown, the operations of the flowchart 1000 are depicted as sequential; in other examples, the operations of the flowchart 1000 may be performed in another order or with additional (or fewer) operations. Variations to the operations may occur in scenarios involving other devices or entities on an IoT deployment network than those illustrated.

As shown, the operations of the flowchart 1000 include: domain registration with resource directory (operation 1010, which may be an optional prerequisite); issuing and processing a request for a foreign domain (inter-domain) resource (operation 1020); the request and generation of authorization in a first domain to request the resource (e.g., to obtain user permission from resource owner based on a policy) (operation 1030); the request and generation of authorization in a second domain to request the resource (e.g., to obtain user permission from resource user based on a policy) (operation 1040); the provisioning and communication of an authorization token from an authorization service to the first and second domain (operation 1050); and the request and obtaining of resource and resource data using the inter-domain token (operation 1060).

Figure 11:
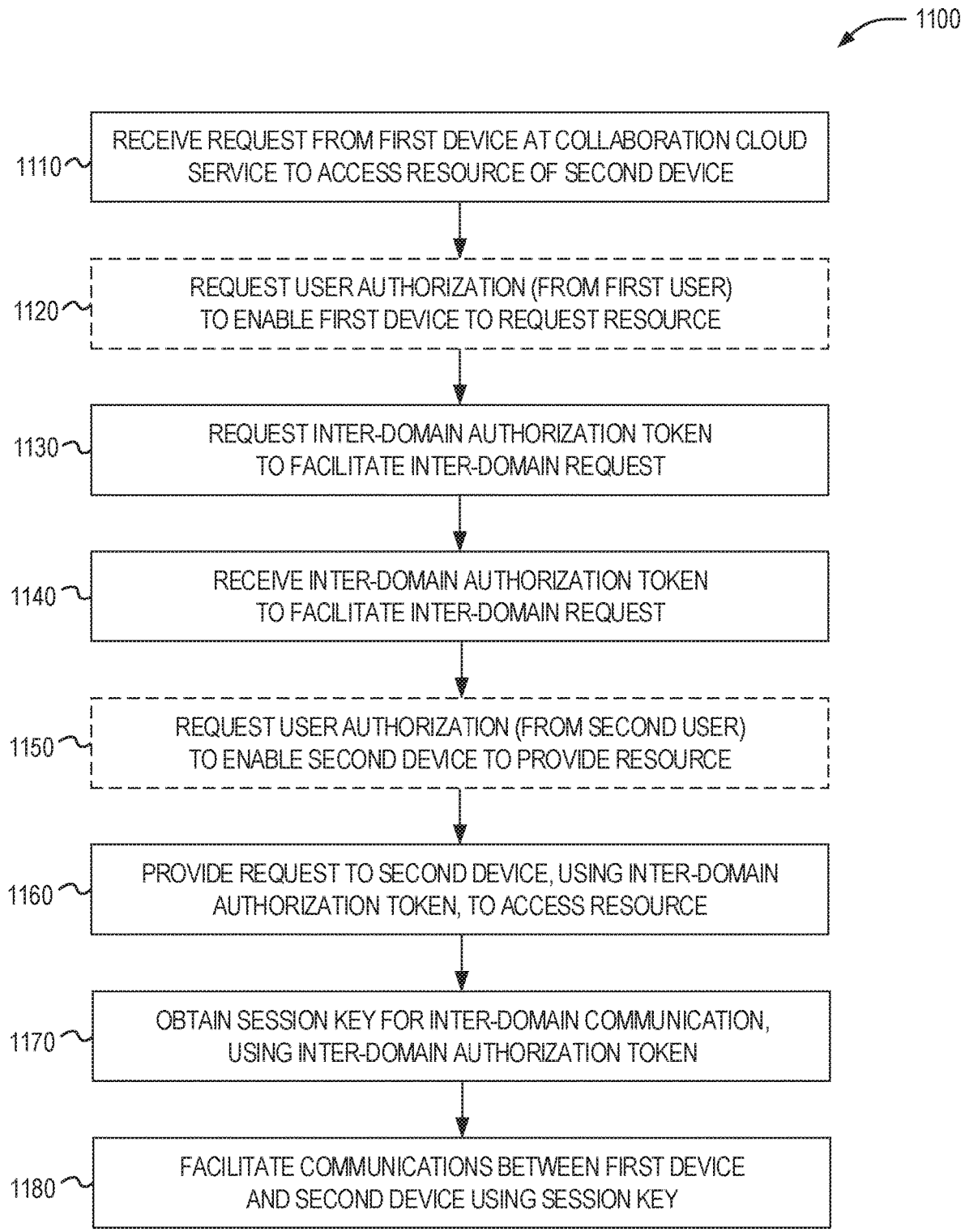
FIG. 11 illustrates a flowchart of an example technique for operating a services model to request inter-domain resources among IoT network domains, according to an example.

FIG. 11 illustrates a flowchart 1100 of an example technique for operating a services model to request inter-domain resources among IoT network domains. The following operations are depicted from the perspective of a collaboration cloud service (e.g., collaboration cloud server) or other intermediate IoT device or system, which facilitates inter-domain communications and exchanges. However, it will be understood that the techniques of flowchart 1100 may be further adapted from the perspective of a client-side device, server-side device, or systems involving both client, server, and intermediate entities.

The flowchart 1100 commences with the receipt of a request, at a collaboration cloud server, with the request being provided from a first device to access a resource of a second device (operation 1110). In an example, the first device operates on a first domain, and the second device operates on a second domain. In a further example, the devices are known to the collaboration cloud service based on a registration of local devices and remote devices within the first domain and the second domain in a third domain accessible to the collaboration cloud service. Also in a further example, the collaboration cloud service is involved with a service discovery for the first domain and the second domain, to allow registration of the respective services in the domains (e.g., services hosted by the first device and the second device).

The flowchart 1100 continues with an optional operation to request user authorization (e.g., from a first administrative user) to enable the first device to request the resource (operation 1120). In this optional example, the operations to request and receive the inter-domain authorization token from the authorization provider are performed responsive to success of this user authorization.

The flowchart 1100 continues with the request of an inter-domain authorization token, to facilitate the inter-domain request (operation 1130), and the receipt of this inter-domain authorization token to facilitate the inter-domain request (operation 1140). In an example, the authorization provider is an OAuth or OAuth2 authorization server, and the inter-domain authorization token is an OAuth token.

The flowchart 1100 continues with another optional operation to request user authorization (e.g., from a second administrative user) to enable the second device operating in the second domain to respond to the request of the resource (operation 1150). In this optional example, the operations to request the access to the resource from the second device are performed responsive to success of this user authorization.

The flowchart 1100 continues with another operation to provide the request to the second device, using the inter-domain authorization token (operation 1160). Based on this request, a session key is obtained for inter-domain communication to exchange data between the first device and the second device (operation 1170). In an example, the collaboration cloud service communicates with a credential management service of the second domain, to obtain the session key; the collaboration cloud service communicates further communicates with a credential management service of the first domain to provide the session key.

The flowchart 1100 concludes with the communications being conducted between the first device and the second device using the session key (operation 1180). These communications may be conducted with further use of the services and features described herein (e.g., as defined as part of RESTful transactions in an OCF-compliant network).

In an example, the operations and functionality described above with reference to FIGS. 3 to 11 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 12:
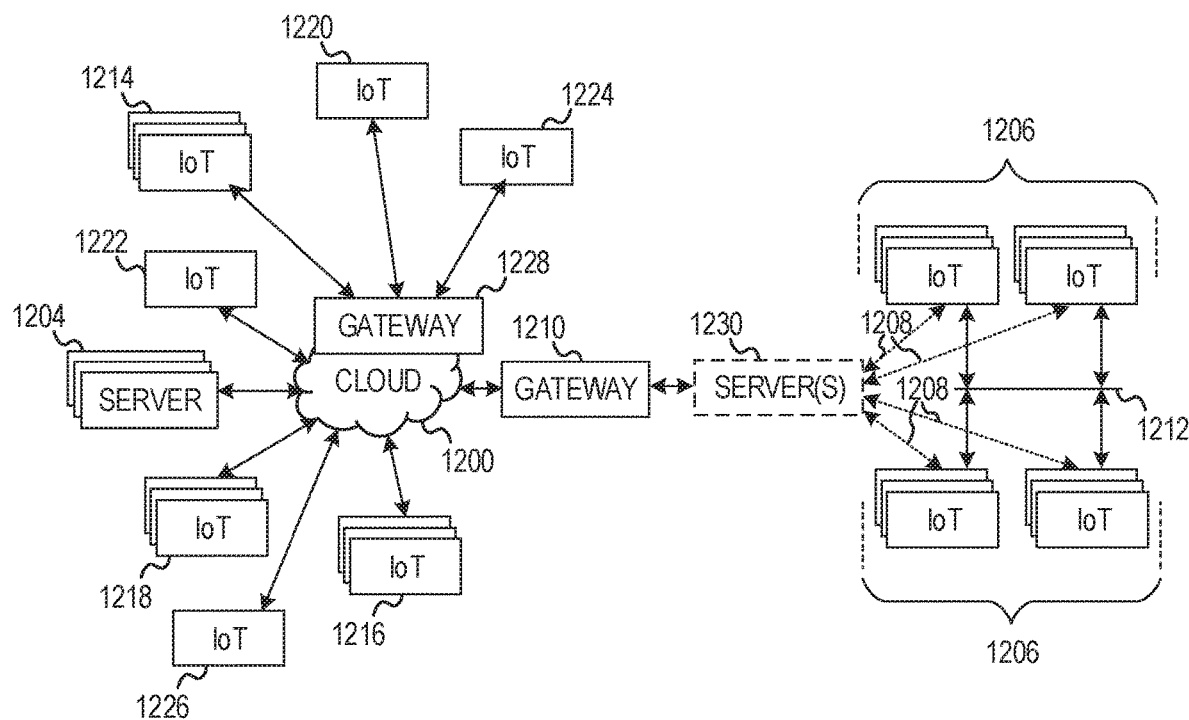
FIG. 12 illustrates a block diagram of a network illustrating communications among a number of IoT devices, according to an example.

FIG. 12 illustrates a drawing of a cloud computing network, or cloud 1200, in communication with a number of Internet of Things (IoT) devices. The cloud 1200 may represent the Internet, or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as the cloud 1200; the IoT devices may also use one or more servers 1230 to facilitate communication with the cloud 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various IoT devices 1214, 1220, 1224 being constrained or dynamic to an assignment and use of resources in the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog device or system (not shown, but depicted in FIG. 2), or a combination therein. The groups of IoT devices may be deployed in various residential, commercial, and industrial settings (including in both private or public environments).

As may be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog device or system (e.g., as described above with reference to FIG. 2).

Figure 13:
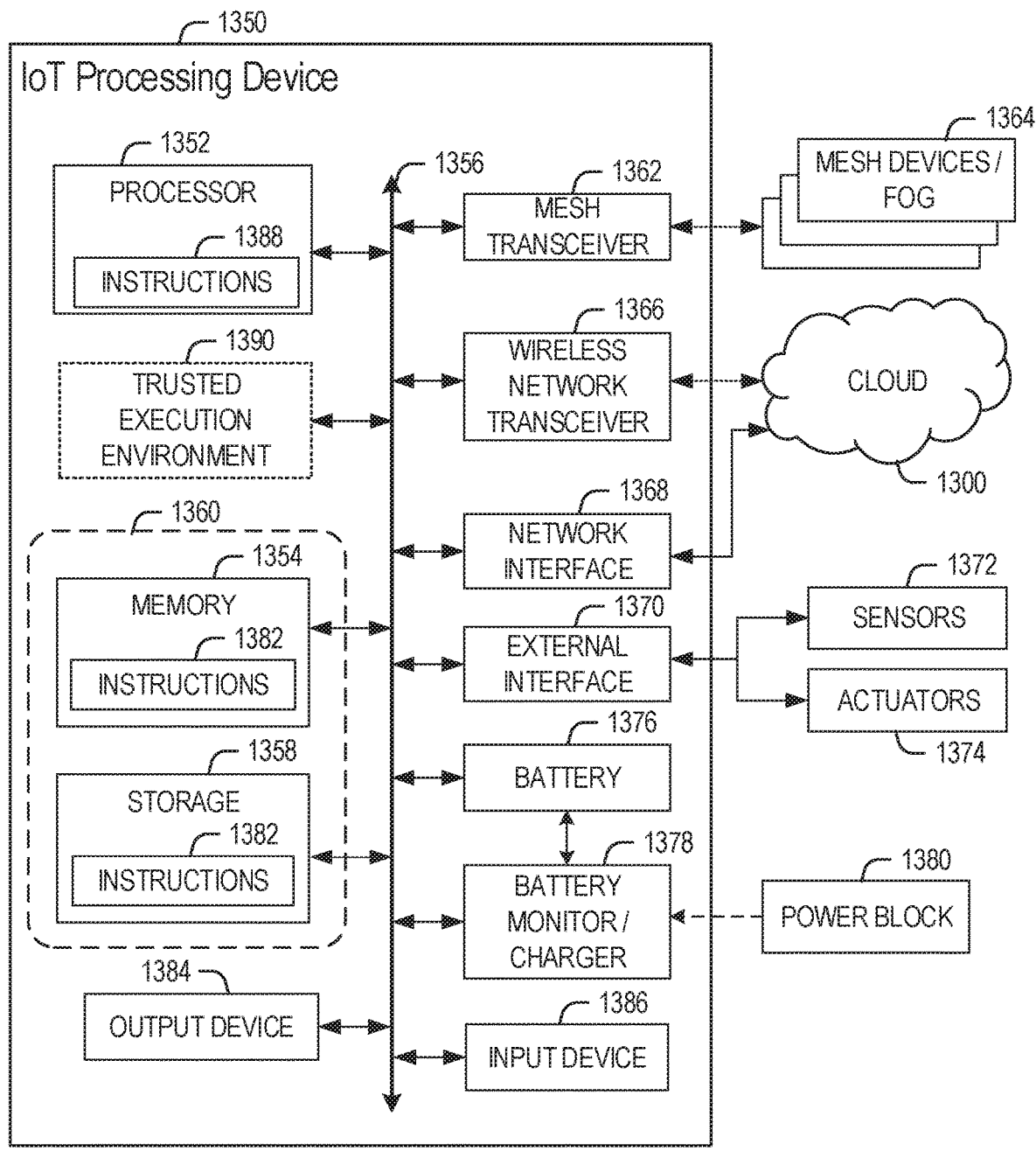
FIG. 13 illustrates a block diagram for an example IoT processing system architecture upon which any one or more of the techniques (e.g., operations, processes, methods, and methodologies) discussed herein may be performed, according to an example.

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include a processor 1352, which may be a microprocessor, a multi-core processor, a multithreaded processor, an ultra-low voltage processor, an embedded processor, or other known processing element. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDiMMs or MiniDIMMs.

To provide for persistent storage of information such as data, applications, operating systems and so forth, a storage 1358 may also couple to the processor 1352 via the interconnect 1356. In an example the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an I2C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN™ (Long Range Wide Area. Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5 G) communication systems, a Global System for Mobile Communications (GSM) radio communication technology, a General Packet Radio Service (CPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to allow connect to a second network, for example, a NIC 1368 providing communications to the cloud over Ethernet, and a second NIC 1368 providing communications to other devices over another type of network.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (Soil) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1378 may communicate the information on the battery 1376 to the processor 1352 over the interconnect 1356. The battery monitor/charger 1378 may also include an analog-to-digital (ADC) convertor that allows the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas, Calif., among others, may be included in the battery monitor/charger 1378. The specific charging circuits chosen depend on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may be embodied by devices described for the storage 1358 of FIG. 13 or may include specific storage units such as optical disks, flash drives, or any number of other hardware devices. The non-transitory, machine readable medium 860 may further include, provide, or invoke instructions 888 to direct the processor 852 to perform a specific sequence or flow of actions, for example, as described with respect to the flowchart(s) and block diagram(s) of operations and functionality depicted above.

In another specific example, the instructions 888 on the processor 852 (separately, or in combination with the instructions 888 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot) Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments are suggested according to the structures and techniques described above, and specified in the following examples and claims.

Example 1 is an apparatus to perform operations for managing communications among Internet of Things (IoT) network domains, the apparatus comprising: a transceiver to communicate with devices via an Internet of Things (IoT) network, wherein the apparatus is connected to multiple domains of the IoT network; processing circuitry to perform operations to: receive, from a first device at a collaboration cloud service, a request to access a resource of a second device operating on a second domain, wherein the first device operates on a first domain; request and receive, from an authorization provider, an inter-domain authorization token to facilitate the request; and request, from the second device, access to the resource on behalf of the first device using the inter-domain authorization token; wherein subsequent communications from the first device to access the second device are performed between the first device and the second device based on a session key obtained with the inter-domain authorization token.

In Example 2, the subject matter of Example 1 includes, the operations of the processing circuitry further to: request, from a first user, a user authorization to allow the first device operating in the first domain to request the resource; wherein the operations to request and receive the inter-domain authorization token from the authorization provider are performed responsive to success of the user authorization.

In Example 3, the subject matter of Examples 1-2 includes, the operations of the processing circuitry further to: request, from a second user, a user authorization to allow the second device operating in the second domain to respond to the request of the resource; wherein the operations to request the access to the resource from the second device are performed responsive to success of the user authorization.

In Example 4, the subject matter of Examples 1-3 includes, the operations of the processing circuitry further to: perform a registration of local devices and remote devices within the first domain and the second domain in a domain accessible to the collaboration cloud service, wherein operations to process the request to access the resource are performed in response to successful registration of the local devices and the remote devices.

In Example 5, the subject matter of Examples 1-4 includes, the operations of the processing circuitry further to: initiate a service discovery within the first domain and the second domain, wherein respective services of the first domain and the second domain are registered by the collaboration cloud service for inter-domain communications in response to the service discovery.

In Example 6, the subject matter of Example 5 includes, wherein the respective services include one or more of: a bridge service, a cloud service, a credential management service, an access management service, or an onboarding service.

In Example 7, the subject matter of Examples 1-6 includes, wherein one or more of the respective services are defined for execution on the first device and on the second device, wherein the first and second devices respectively include a hardware root-of-trust to establish authentication information, identification information, and credentials for operation of the one or more of the respective services.

In Example 8, the subject matter of Examples 1-7 includes, the operations of the processing circuitry further to: communicate with a credential management service of the second domain, to provide the session key from the credential management service of the second domain; and communicate with a credential management service of the first domain, to provide the session key to the credential management service of the first domain.

In Example 9, the subject matter of Example 8 includes, wherein the first device connects to the credential management service of the first domain using a first pre-shared key, and wherein the second device connects to the credential management service of the second domain using a second pre-shared key.

In Example 10, the subject matter of Examples 1-9 includes, wherein at least one of the first device and the second device operates as a respective shadow device of a respective actual device, and wherein the session key is used in an encryption of the subsequent communications through the respective shadow device to the respective actual device.

In Example 11, the subject matter of Example 10 includes, wherein the respective shadow device operates as a cryptographic endpoint, wherein respective messages in the subsequent communications through the respective shadow device are encrypted with a first domain encryption key and re-encrypted with a second domain encryption key.

In Example 12, the subject matter of Examples 1-11 includes, or Bluetooth communication standard.

In Example 13, the subject matter of Examples 1-12 includes, wherein network communications performed by the apparatus to perform the operations comprise Representational State Transfer (RESTful) interactions among one or more Internet of Things (IoT) network topologies, and wherein the network communications are conducted according to one or more Open Connectivity Foundation (OCF) specifications.

Example 14 is a method, comprising a plurality of operations executed with a processor and memory of a cloud service device, to perform operations for managing communications in an Internet of Things (IoT) network, wherein the cloud service device is connected to multiple domains of the IoT network, with the operations comprising: receiving, from a first device at a collaboration cloud service, a request to access a resource of a second device operating on a second domain, wherein the first device operates on a first domain; requesting and receiving, from an authorization provider, an inter-domain authorization token to facilitate the request; and requesting, from the second device, access to the resource on behalf of the first device using the inter-domain authorization token; wherein subsequent communications from the first device to access the second device are performed between the first device and the second device based on a session key obtained with the inter-domain authorization token.

In Example 15, the subject matter of Example 14 includes, the operations further comprising: transmitting a request, to a first user, to obtain a user authorization to allow the first device operating in the first domain to request the resource; wherein the operations of requesting and receiving the inter-domain authorization token from the authorization provider are performed responsive to success of the user authorization.

In Example 16, the subject matter of Example 15 includes, the operations further comprising: receiving, from the first user, the user authorization to allow the first device operating in the first domain to request the resource; wherein the subsequent communications between the first device and the second device occur without use of the cloud service device.

In Example 17, the subject matter of Examples 14-16 includes, the operations further comprising: requesting, from a second user, a user authorization to allow the second device operating in the second domain to respond to the request of the resource; wherein the operations to request the access to the resource from the second device are performed responsive to success of the user authorization.

In Example 18, the subject matter of Examples 14-17 includes, the operations further comprising: registering of local devices and remote devices within the first domain and the second domain in a domain accessible to the collaboration cloud service, wherein operations to process the request to access the resource are performed in response to successful registration of the local devices and the remote devices.

In Example 19, the subject matter of Examples 14-18 includes, the operations further comprising: performing a service discovery within the first domain and the second domain, wherein respective services of the first domain and the second domain are registered by the collaboration cloud service for inter-domain communications in response to the service discovery.

In Example 20, the subject matter of Example 19 includes, wherein the respective services include one or more of: a bridge service, a cloud service, a credential management service, an access management service, or an onboarding service.

In Example 21, the subject matter of Example 20 includes, wherein one or more of the respective services are defined for execution on the first device and on the second device, wherein the first and second devices respectively include a hardware root-of-trust to establish authentication information, identification information, and credentials for operation of the one or more of the respective services.

In Example 22, the subject matter of Example 21 includes, wherein the hardware root-of-trust on the respective first and second device is provided by a trusted execution environment (TEE).

In Example 23, the subject matter of Examples 14-22 includes, the operations further comprising: communicating with a credential management service of the second domain, wherein the session key is provided from the credential management service of the second domain with the communicating; and communicating with a credential management service of the first domain, wherein the session key is provided to the credential management service of the first domain with the communicating.

In Example 24, the subject matter of Example 23 includes, wherein the first device connects to the credential management service of the first domain using a first pre-shared key, and wherein the second device connects to the credential management service of the second domain using a second pre-shared key.

In Example 25, the subject matter of Examples 14-24 includes, wherein at least one of the first device and the second device operates as a respective shadow device of a respective actual device, and wherein the session key is used in an encryption of the subsequent communications through the respective shadow device to the respective actual device.

In Example 26, the subject matter of Example 25 includes, wherein the respective shadow device operates as a cryptographic endpoint, wherein respective messages in the subsequent communications through the respective shadow device are encrypted with a first domain encryption key and re-encrypted with a second domain encryption key.

In Example 27, the subject matter of Examples 14-26 includes, wherein the first device is represented by a cloud service hosted on a cloud hosting platform, wherein the cloud service is used to proxy connectivity between devices in the first domain, including devices connected to the first device via a local network, and devices connected to the first device via a remote network.

In Example 28, the subject matter of Examples 14-27 includes, authorization server, and wherein the inter-domain authorization token is an OAuth token.

In Example 29, the subject matter of Examples 14-28 includes, wherein operations of requesting and receiving are conducted in respective RESTful transactions with the cloud service device, and wherein the respective RESTful transactions are conducted according to an Open Connectivity Foundation (OCF) specification.

Example 30 is a device-readable storage medium including instructions, wherein the instructions, when executed by a processing circuitry of a device, cause the processing circuitry to perform operations of any of Examples 14 to 29.

Example 31 is a system, comprising: an Internet of things (IoT) device, comprising processing circuitry and a memory device, wherein the memory device stores instructions that, which when executed by the processing circuitry, configure the processing circuitry to perform operations for utilizing a services model to manage communications in an IoT network, the operations of the IoT device comprising: establishing a resource type data collection in the IoT device, the resource type data collection comprising respective resource type values to indicate respective services associated with the IoT device, wherein the respective services include, a cloud services (CS) resource, wherein the CS resource is associated with a plurality of devices on a first domain of the IoT network, wherein the plurality of devices are proxy devices that are linked to actual devices in the first domain; communicating, to the CS resource, a request to access a resource of a second device operating on a second domain; and receiving, from the CS resource, a session key to access the resource of the second device, wherein the CS resource provides the session key based on use of a cloud collaboration service; wherein the cloud collaboration service facilitates the request to access the resource based on communications among the cloud service, the cloud collaboration service, and an authorization provider, wherein the authorization provider enables the communications using an inter-domain authorization token.

In Example 32, the subject matter of Example 31 includes, an intermediate device to operate at least one of the respective services in the IoT network, the at least one of the respective services including: a device owner transfer service (DOTS), an access management service (AMS), a credential management service (CMS), or a bridge; wherein the intermediate device is used to establish connectivity with the cloud collaboration service.

In Example 33, the subject matter of Examples 31-32 includes, the operations of the IoT device further comprising: establishing data values in a hardware root-of-trust, wherein the hardware root-of-trust maintains at least one key, a device identifier, and a domain identifier, and wherein the at, least one key, the device identifier, and the domain identifier are communicated in the request to access the resource of the second device.

In Example 34, the subject matter of Examples 31-33 includes, a cloud service device to operate the collaboration cloud service, with operations of the collaboration cloud service comprising: receiving, from the IoT device, a request to access the resource of the second device operating on the second domain, wherein the IoT device operates on the first domain; requesting and receiving, from the authorization provider, the inter-domain authorization token to facilitate the request; and requesting, from the second device, access to the resource on behalf of the IoT device using the inter-domain authorization token; wherein subsequent communications from the IoT device to access the second device are performed between the IoT device and the second device based on the session key obtained with the inter-domain authorization token.

In Example 35, the subject matter of Examples 31-34 includes, wherein the MT device and the IoT network are adapted to operate according to a specification defined by at least a portion of an Open Connectivity Foundation (OCF) standard.

Example 36 is an apparatus, comprising: means for receiving, from a first device at a collaboration cloud service, a request to access a resource of a second device operating on a second domain, wherein the first device operates on a first domain; means for requesting and receiving, from an authorization provider, an inter-domain authorization token to facilitate the request; and means for requesting, from the second device, access to the resource on behalf of the first device using the inter-domain authorization token; wherein subsequent communications from the first device to access the second device are performed between the first device and the second device based on a session key obtained with the inter-domain authorization token.

In Example 37, the subject matter of Example 36 includes, means for transmitting a request, to a first user, to obtain a user authorization to allow the first device operating in the first domain to request the resource; wherein the operations of requesting and receiving the inter-domain authorization token from the authorization provider are performed responsive to success of the user authorization.

In Example 38, the subject matter of Example 37 includes, means for receiving, from the first user, the user authorization to allow the first device operating in the first domain to request the resource; wherein the subsequent communications between the first device and the second device occur without use of the cloud service device.

In Example 39, the subject matter of Examples 36-38 includes, means for requesting, from a second user, a user authorization to allow the second device operating in the second domain to respond to the request of the resource; wherein the operations to request the access to the resource from the second device are performed responsive to success of the user authorization.

In Example 40, the subject matter of Examples 36-39 includes, means for registering of local devices and remote devices within the first domain and the second domain in a domain accessible to the collaboration cloud service, wherein operations to process the request to access the resource are performed in response to successful registration of the local devices and the remote devices.

In Example 41, the subject matter of Examples 36-40 includes, means for performing a service discovery within the first domain and the second domain, wherein respective services of the first domain and the second domain are registered by the collaboration cloud service for inter-domain communications in response to the service discovery; wherein the respective services include one or more of: a bridge service, a cloud service, a credential management service, an access management service, or an onboarding service.

In Example 42, the subject matter of Example 41 includes, means for maintaining a hardware root-of-trust on the respective first and second devices, wherein the hardware root-of-trust is used to maintain authentication information, identification information, and credentials for operation of the one or more of the respective services.

In Example 43, the subject matter of Examples 36-42 includes, means for communicating with a credential management service of the second domain, wherein the session key is provided from the credential management service of the second domain with the communicating; and means for communicating with a credential management service of the first domain, wherein the session key is provided to the credential management service of the first domain with the communicating; wherein the first device connects to the credential management service of the first domain using a first pre-shared key, and wherein the second device connects to the credential management service of the second domain using a second pre-shared key.

In Example 44, the subject matter of Examples 36-43 includes, means for operating the apparatus according to an Open Connectivity Foundation (OCF) specification.

Example 45 is a device fog adapted to perform the operations of any of Examples 1 to 44.

Example 46 is a cloud service server adapted to perform the operations of a cloud service invoked by any of Examples 1 to 44.

Example 47 is an edge computing device adapted to perform the operations of a client device invoked by any of Examples 1 to 44.

Example 48 is a credential management service server adapted to perform the operations of credentialing invoked by any of Examples 1 to 44.

Example 49 is an authentication management service server adapted to perform the operations of authentication invoked by any of Examples 1 to 44.

Example 50 is a device onboarding service server adapted to perform the operations of onboarding invoked by any of Examples 1 to 44.

Example 51 is an Open Connectivity Foundation (OCF) device, configured as a server, client, or intermediary according to an OCF specification, comprising means to implement the operations of any of Examples 1 to 44.

Example 52 is an Internet of Things (IoT) network topology, the IoT network topology comprising respective communication links adapted to perform communications for the operations of any of Examples 1 to 44.

Example 53 is a network comprising respective devices and device communication mediums for performing any of the operations of Examples 1 to 44.

Example 54 is an apparatus comprising means for performing any of the operations of Examples 1 to 44.

Example 55 is a system to perform the operations of any of Examples 1 to 54.

Example 56 is a method to perform the operations of any of Examples 1 to 54.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus to perform operations for managing communications among Internet of Things (IoT) network domains, the apparatus comprising:
    a transceiver to communicate with devices via an Internet of Things (IoT) network, wherein the apparatus is connected to multiple domains, wherein the multiple domains include respective groups of IoT devices connected via the IoT network; and
    processing circuitry to perform operations at a collaboration cloud service to:
        receive, from a first device at the collaboration cloud service, a request, wherein the first device operates on a first domain, wherein the collaboration cloud service is configured to issue and revoke access to services in a second domain, and
        wherein the request, follows an IoT resource model to access a resource of a second device operating on the second domain, wherein the IoT resource model defines functions and message structures for communication with the resource of the second device, wherein the second device operates as a shadow device of a corresponding actual device in the IoT network, and wherein the shadow device provides the same functions as the corresponding actual device while the shadow device invokes domain-specific functions for use of the corresponding actual device in the second domain;

request and receive, from an authorization provider and via the collaboration cloud service, an inter-domain authorization token to facilitate the request, wherein the inter-domain authorization token is configured to revoke or authorize access to the domain-specific functions in the second domain; and request, from the second device at the collaboration cloud service, access to the resource on behalf of the first device using the inter-domain authorization token;

wherein the collaboration cloud service is located outside the first and second domains; and wherein subsequent communications from the first device to access the second device are performed between the first device and the second device, independent of the collaboration cloud service, based on a session key obtained with the inter-domain authorization token, wherein the session key enables respective functions to be accessed between the IoT devices in the first domain and the IoT devices in the second domain, according to the use of the IoT resource model in the subsequent communications between the first device and the second device.

2. The apparatus of claim 1, the operations of the processing circuitry further to:

request, from a first user, a user authorization to allow the first device operating in the first domain to request the resource;

wherein the operations to request and receive the inter-domain authorization token from the authorization provider are performed responsive to success of the user authorization.

3. The apparatus of claim 2, the operations of the processing circuitry further to:

request, from a second user, a user authorization to allow the second device operating in the second domain to respond to the request of the resource;

wherein the operations to request the access to the resource from the second device are performed responsive to success of the user authorization.

4. The apparatus of claim 1, the operations of the processing circuitry further to:

perform a registration of local devices and remote devices within the first domain and the second domain in a domain accessible to the collaboration cloud service, wherein operations to process the request to access the resource are performed in response to successful registration of the local devices and the remote devices.

5. The apparatus of claim 1, the operations of the processing circuitry further to:

initiate a service discovery within the first domain and the second domain, wherein respective services of the first domain and the second domain are registered by the collaboration cloud service for inter-domain communications in response to the service discovery;

wherein the respective services include one or more of: a bridge service, a cloud service, a credential management service, an access management service, or an onboarding service.

6. The apparatus of claim 1, wherein one or more of the respective services are defined for execution on the first device and on the second device, wherein the first and second devices respectively include a hardware root-of-trust to establish authentication information, identification information, and credentials for operation of the one or more of the respective services.

7. The apparatus of claim 1, the operations of the processing circuitry further to:

communicate with a credential management service of the second domain, to provide the session key from the credential management service of the second domain; and communicate with a credential management service of the first domain, to provide the session key to the credential management service of the first domain;

wherein the first device connects to the credential management service of the first domain using a first pre-shared key, and wherein the second device connects to the credential management service of the second domain using a second pre-shared key.

8. The apparatus of claim 1, wherein the session key is used in an encryption of the subsequent communications through the shadow device to the corresponding actual device.

9. The apparatus of claim 1, wherein network communications performed by the apparatus to perform the operations comprise Representational State Transfer (RESTful) interactions among one or more Internet of Things (IoT) network topologies, and wherein the network communications are conducted according to one or more Open Connectivity Foundation (OCF) specifications.

10. At least one non-transitory device-readable storage medium including instructions, wherein the instructions, when executed by a processing circuitry of a cloud service de-vice, cause the processing circuitry to perform operations for managing communications in an Internet of Things (IoT) network using a collaboration cloud service, where the cloud service device is connected to multiple domains, wherein the multiple domains include respective groups of IoT devices connected via the IoT network, with operations performed by the collaboration cloud service comprising:

receiving, from a first device at the collaboration cloud service, a request, wherein the first device operates on a first domain, wherein the collaboration cloud service is configured to issue and revoke access to services in a second domain, and wherein the request follows an IoT resource model to access a resource of a second device operating on the second domain, wherein the IoT resource model defines functions and message structures for communication with the resource of the second device, wherein the second device operates as a shadow device of a corresponding actual device in the IoT network, and wherein the shadow device provides the same functions as the corresponding actual device while the shadow device invokes domain-specific functions for use of the corresponding actual device in the second domain;

requesting and receiving, from an authorization provider and via the collaboration cloud service, an inter-domain authorization token to facilitate the request, wherein the inter-domain authorization token is configured to revoke or authorize access to the domain-specific functions in the second domain; and requesting, from the second device at the collaboration cloud service, access to the resource on behalf of the first device using the inter-domain authorization token;

wherein the collaboration cloud service is located outside the first and second domains; and wherein subsequent communications from the first device to access the second device are performed between the first device and the second device, independent of the collaboration cloud service, based on a session key obtained with the inter-domain authorization token, wherein the session key enables respective functions to be accessed between the devices in the first domain and the IoT devices in the second domain, according to the use of the IoT resource model in the subsequent communications between the first device and the second device.

11. The storage medium of claim 10, the operations further comprising:
receiving, from a first user, a user authorization to allow the first device operating in the first domain to request the resource;
wherein the subsequent communications between the first device and the second device occur without use of the cloud service device.

12. The storage medium of claim 11, the operations further comprising:
receiving, from a second user, a user authorization to allow the second device operating in the second domain to respond to the request of the resource;
wherein the operations to request the access to the resource from the second device are performed responsive to success of the user authorization.

13. The storage medium of claim 10, the operations further comprising:
registering of local devices and remote devices within the first domain and the second domain in a domain accessible to the collaboration cloud service, wherein operations to process the request to access the resource are performed in response to successful registration of the local devices and the remote devices.

14. The storage medium of claim 10, the operations further comprising:
performing a service discovery within the first domain and the second domain, wherein respective services of the first domain and the second domain are registered by the collaboration cloud service for inter-domain communications in response to the service discovery;
wherein the respective services include one or more of: a bridge service, a cloud service, a credential management service, an access management service, or an onboarding service.

15. The storage medium of claim 10, the operations further comprising:
communicating with a credential management service of the second domain, wherein the session key is provided from the credential management service of the second domain with the communicating; and
communicating with a credential management service of the first domain, wherein the session key is provided to the credential management, service of the first, domain with the communicating;
wherein the first device connects to the credential management service of the first domain using a first pre-shared key, and wherein the second device connects to the credential management service of the second domain using a second pre-shared key.

16. The storage medium of claim 10, wherein the session key is used in an encryption of the subsequent communications through the shadow device to the corresponding actual device.

17. The storage medium of claim 10, wherein operations of requesting and receiving are conducted in respective RESTful transactions with the cloud service device, and wherein the respective RESTful transactions are conducted according to an Open Connectivity Foundation (OCF) specification.

18. A method, comprising a plurality of operations executed with a processor and memory of a cloud service device, to perform operations for managing communications in an Internet of Things (IoT) network using a collaboration cloud service, where the cloud service device is connected to multiple domains, wherein the multiple domains include respective groups of IoT devices connected via the IoT network, with the operations performed by the collaboration cloud service comprising:
receiving, from a first device at the collaboration cloud service, a request, wherein the first device operates on a first domain, wherein the collaboration cloud service is configured to issue and revoke access to services in a second domain, and
wherein the request follows an IoT resource model to access a resource of a second device operating on the second domain, wherein the IoT resource model defines functions and message structures for communication with the resource of the second device, wherein the second device operates as a shadow device of a corresponding actual device in the IoT network, and wherein the shadow device provides the same functions as the corresponding actual device while the shadow device invokes domain-specific functions for use of the corresponding actual device in the second domain;
requesting and receiving, from an authorization provider and via the collaboration cloud service, an inter-domain authorization token, to facilitate the request, wherein the inter-domain authorization token is configured to revoke or authorize access to the domain-specific functions in the second domain;
requesting, from the second device at the collaboration cloud service, access to the resource on behalf of the first device using the inter-domain authorization token;
wherein the collaboration cloud service is located outside the first and second domains; and
wherein subsequent communications from the first device to access the second device are performed between the first device and the second device, independent of the collaboration cloud service, based on a session key obtained with the inter-domain authorization token, wherein the session key enables respective functions to be accessed between the IoT devices in the first domain and the IoT devices in the second domain, according to the use of the IoT resource model.

19. The method of claim 18, the operations further comprising:
receiving, from a first user, user authorization to allow the first device operating in the first domain to request the resource;
wherein the subsequent communications between the first device and the second device occur without use of the cloud service device.

20. The method of claim 19, the operations further comprising:
requesting, from a second user, a user authorization to allow the second device operating in the second domain to respond to the request of the resource;
wherein the operations to request the access to the resource from the second device are performed responsive to success of the user authorization.

21. The method of claim 18, the operations further comprising:
    registering of local devices and remote devices within the first domain and the second domain in a domain accessible to the collaboration cloud service, wherein operations to process the request to access the resource are performed in response to successful registration of the local devices and the remote devices.

22. The method of claim 18, the operations further comprising:
    performing a service discovery within the first domain and the second domain, wherein respective services of the first domain and the second domain are registered by the collaboration cloud service for inter-domain communications in response to the service discovery;
    wherein the respective services include one or more of: bridge service, a cloud service, a credential management service, an access management service, or an onboarding service.

23. The method of claim 18, the operations further comprising:
    communicating with a credential management service of the second domain, wherein the session key is provided from the credential management service of the second domain with the communicating; and
    communicating with a credential management service of the first domain, wherein the session key is provided to the credential management, service of the first, domain with the communicating;
    wherein the first device connects to the credential management service of the first domain using a first pre-shared key, and wherein the second device connects to the credential management service of the second domain using a second pre-shared key.

24. The method of claim 18, wherein the session key is used in an encryption of the subsequent, communications through the shadow device to the corresponding actual device.

25. The method of claim 18, wherein operations of requesting and receiving are conducted in respective RESTful transactions with the cloud service device, and wherein the respective RESTful transactions are conducted according to an Open Connectivity Foundation (OCF) specification.

* * * * *

UNITED STATES PATENT AND TRADEMARK OFFICE
CERTIFICATE OF CORRECTION

PATENT NO. : 11,025,627 B2  
APPLICATION NO. : 15/865984  
DATED : June 1, 2021  
INVENTOR(S) : Li et al.

Page 1 of 1

It is certified that error appears in the above-identified patent and that said Letters Patent is hereby corrected as shown below:

In the Claims

In Column 30, Line 58, in Claim 1, delete "request," and insert --request-- therefor In Column 32, Line 33, in Claim 10, delete "de-vice," and insert --device,-- therefor In Column 33, Line 7, in Claim 10, before "devices", insert --IoT--

In Column 33, Line 55, in Claim 15, delete "management," and insert --management-- therefor In Column 33, Line 55, in Claim 15, delete "first," and insert --first-- therefor In Column 36, Line 5, in Claim 23, delete "management," and insert --management-- therefor In Column 36, Line 5, in Claim 23, delete "first," and insert --first-- therefor In Column 36, Line 13, in Claim 24, delete "subsequent," and insert --subsequent-- therefor Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*